(12) United States Patent
Winker et al.

(10) Patent No.: US 6,320,634 B1
(45) Date of Patent: *Nov. 20, 2001

(54) ORGANIC POLYMER O-PLATE COMPENSATOR FOR IMPROVED GRAY SCALE PERFORMANCE IN TWISTED NEMATIC LIQUID CRYSTAL DISPLAYS

(75) Inventors: Bruce K. Winker, Moorpark; Hong-Son Ryang; Leslie F. Warren, Jr., both of Camarillo; Charles Rosenblatt, Beachwood; Zili Li, Thousand Oaks; Young J. Chung, Calabasas, all of CA (US)

(73) Assignee: Rockwell International Corporation, Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/388,131

(22) Filed: Sep. 1, 1999

Related U.S. Application Data

(62) Division of application No. 08/947,531, filed on Jul. 30, 1997, which is a continuation of application No. 08/313,531, filed on Sep. 30, 1994, now abandoned, which is a continuation-in-part of application No. 08/223,251, filed on Apr. 4, 1994, now Pat. No. 5,504,603.

(51) Int. Cl.[7] .................................................. G02F 1/1335
(52) U.S. Cl. ........................... 349/117; 349/118; 349/119
(58) Field of Search .................................. 349/117, 118, 349/119, 120, 121

(56) References Cited

U.S. PATENT DOCUMENTS

| 3,807,831 | 4/1974 | Soref ..................................... 350/150 |
| 3,924,930 | 12/1975 | Dewhirst et al. ..................... 350/157 |

(List continued on next page.)

FOREIGN PATENT DOCUMENTS

| 39 25 382 | 1/1991 | (DE) . |
| 0 350 383 | 1/1990 | (EP) . |

(List continued on next page.)

OTHER PUBLICATIONS

"Full–Cone Wide–Viewing–Angle Multicolor CSH–LCD," Tsuyoshi Yamamoto, Shin'ichi Hirose, Jean F. Clerc, Yasushi Kondo, Shigekazu Yamauchi, Masanobu Aizawa; SID 91 Digest, pp. 762–765 (4 sheets).

"Highly Multiplexed Super Homeotropic LCD," J. F. Clerc, M. Aizawa, S. Yamauchi, J. Duchene; Japan Display '89, pp. 188–191 (4 sheets).

(List continued on next page.)

*Primary Examiner*—Walter J. Malinowski
(74) *Attorney, Agent, or Firm*—Foley & Lardner

(57) ABSTRACT

An O-plate compensator comprising an organic liquid crystal polymer, and methods for fabricating the same, are disclosed. The compensator is a uniaxial birefringent thin film with its extraordinary axis oriented obliquely with respect to the surface of the film. (It is noted that the birefringent thin film could be weakly biaxial.) The oblique orientation of the liquid crystal director, which is parallel to the films extraordinary axis, is achieved by casting an organic thin film onto a surface specially prepared for a orienting liquid crystals, such as obliquely deposited SiO, mechanically rubbed alignment agents. The film can either be cast from a solution of the liquid crystal polymer or from a reactive liquid crystal monomer having a nematic phase. Any solvent that may be used during the fabrication process is evaporated off and the organic thin film is held at a temperature in its nematic phase. If a reactive monomer is used, the film is then photopolymerized. Alternative embodiments of an organic O-plate include the use of smectic-A and smectic-C materials. Fabrication techniques employing these materials are described.

46 Claims, 13 Drawing Sheets

U.S. PATENT DOCUMENTS

| | | | |
|---|---|---|---|
| 3,960,438 | 6/1976 | Bonne et al. | 350/160 LC |
| 4,032,218 | 6/1977 | Scheffer | 350/160 LC |
| 4,073,571 | 2/1978 | Grinberg et al. | 350/337 |
| 4,685,771 | 8/1987 | West et al. | 350/347 V |
| 4,688,900 | 8/1987 | Doane et al. | 350/347 V |
| 4,701,028 | 10/1987 | Clerc et al. | 350/337 |
| 4,889,412 | 12/1989 | Clerc et al. | 350/347 E |
| 4,984,872 | 1/1991 | Vick | 350/321 |
| 5,061,042 | 10/1991 | Nakamura et al. | 359/63 |
| 5,124,824 | 6/1992 | Kozaki et al. | 359/73 |
| 5,134,507 | 7/1992 | Ishii | 359/94 |
| 5,138,474 | 8/1992 | Arakawa | 359/73 |
| 5,161,042 | 11/1992 | Hamada | 359/41 |
| 5,175,638 | 12/1992 | Kanemoto et al. | 359/73 |
| 5,193,020 | 3/1993 | Shiozaki et al. | 359/73 |
| 5,194,975 | 3/1993 | Akatsuka et al. | 359/73 |
| 5,196,953 | 3/1993 | Yeh et al. | 359/73 |
| 5,213,852 | 5/1993 | Arakawa et al. | 428/1 |
| 5,227,903 | 7/1993 | Miyazawa et al. | 359/73 |
| 5,235,443 | 8/1993 | Barnik et al. | 359/37 |
| 5,243,451 | 9/1993 | Kanemoto et al. | 359/53 |
| 5,245,456 | 9/1993 | Yoshimi et al. | 359/73 |
| 5,250,214 | 10/1993 | Kanemoto et al. | 252/299.01 |
| 5,260,109 | 11/1993 | Iida et al. | 428/1 |
| 5,285,303 | 2/1994 | Okada et al. | 359/73 |
| 5,319,478 | 6/1994 | Fünfschilling et al. | 359/53 |
| 5,321,533 | 6/1994 | Kumar | 359/51 |
| 5,344,916 | 9/1994 | Harris et al. | 528/353 |
| 5,410,422 | 4/1995 | Bos | 359/73 |
| 5,413,657 | 5/1995 | Yamanashi et al. | 156/235 |
| 5,430,565 | 7/1995 | Yamanouchi et al. | 359/73 |
| 5,430,566 | 7/1995 | Sakaya et al. | 359/73 |
| 5,456,867 | 10/1995 | Mazaki et al. | 264/2.6 |
| 5,460,748 | 10/1995 | Mazaki et al. | 252/299.01 |
| 5,462,621 | 10/1995 | Ishii | 156/229 |
| 5,472,538 | 12/1995 | Minakuchi et al. | 156/85 |
| 5,472,635 | 12/1995 | Iida et al. | 252/299.01 |
| 5,477,358 | 12/1995 | Rosenblatt et al. | 359/77 |
| 5,490,006 | 2/1996 | Masumoto et al. | 359/73 |
| 5,491,001 | 2/1996 | Mazaki et al. | 427/162 |
| 5,496,498 | 3/1996 | Toyooka et al. | 252/299.01 |
| 5,504,603 * | 4/1996 | Winker et al. | 349/117 |
| 5,506,706 | 4/1996 | Yamahara et al. | 359/73 |
| 5,510,913 | 4/1996 | Hashimoto et al. | 359/37 |
| 5,518,783 | 5/1996 | Kawata et al. | 428/1 |
| 5,526,150 | 6/1996 | Mazaki et al. | 359/73 |
| 5,528,400 | 6/1996 | Arakawa | 359/73 |
| 5,532,851 | 7/1996 | Usami | 359/73 |
| 5,559,618 | 9/1996 | Mori | 359/73 |
| 5,568,290 | 10/1996 | Nakamura | 359/63 |
| 5,589,963 | 12/1996 | Gunning, III et al. | 349/119 |
| 5,612,801 | 3/1997 | Winker | 349/119 |
| 5,619,352 * | 4/1997 | Koch et al. | 349/119 |
| 5,638,197 | 6/1997 | Gunning, III et al. | 349/96 |
| 5,986,734 * | 11/1999 | Winker et al. | 349/123 |

FOREIGN PATENT DOCUMENTS

| | | |
|---|---|---|
| 0 367 288 | 5/1990 | (EP) . |
| 0 529 813 | 3/1993 | (EP) . |
| 0 543 678 | 5/1993 | (EP) . |
| 0 576 931 | 1/1994 | (EP) . |
| 0 606 940 | 7/1994 | (EP) . |
| 0 702 260 | 3/1996 | (EP) . |
| 63-239421 | 10/1988 | (JP) . |
| 2-285303 | 11/1990 | (JP) . |
| 2-308128 | 12/1990 | (JP) . |
| 3-28822 | 2/1991 | (JP) . |
| 3-114023 | 5/1991 | (JP) . |
| 3-257424 | 11/1991 | (JP) . |
| 4-3018 | 1/1992 | (JP) . |
| 4-3110 | 1/1992 | (JP) . |
| 4-101119 | 4/1992 | (JP) . |
| 4-120512 | 4/1992 | (JP) . |
| 4113301 | 4/1992 | (JP) . |
| 4-153622 | 5/1992 | (JP) . |
| 5-80323 | 4/1993 | (JP) . |
| 5-157911 | 6/1993 | (JP) . |
| 5-157913 | 6/1993 | (JP) . |
| 5-196818 | 8/1993 | (JP) . |
| 6-75116 | 3/1994 | (JP) . |
| 6-102504 | 4/1994 | (JP) . |
| 6-174920 | 6/1994 | (JP) . |
| 6-194646 | 7/1994 | (JP) . |
| 6-235820 | 8/1994 | (JP) . |
| 6-265728 | 9/1994 | (JP) . |
| 6-300920 | 10/1994 | (JP) . |
| 7-110406 | 4/1995 | (JP) . |
| 7-98413 | 4/1995 | (JP) . |
| 7-151915 | 6/1995 | (JP) . |
| 7-168020 | 7/1995 | (JP) . |
| 7-281028 | 10/1995 | (JP) . |
| 7-287119 | 10/1995 | (JP) . |
| 7-287120 | 10/1995 | (JP) . |

OTHER PUBLICATIONS

"Vertically Aligned Liquid–Crystal Displays, " Jean Frederic Clerc; SID 91 Digest, pp. 758—761 (4 sheets).

Macleod, H. Angus. Structure–Related Optical Properties of Thin Films. Journal of Vacuum Science Technology A, vol. 4, No. 3 (1986) pp. 418–422.

Motohiro, T. and Taga, Y. Thin film Retardation Plate by Oblique Deposition. Applied Optics, vol. 28, No. 13 (Jul. 1, 1989), p. 2466.

* cited by examiner

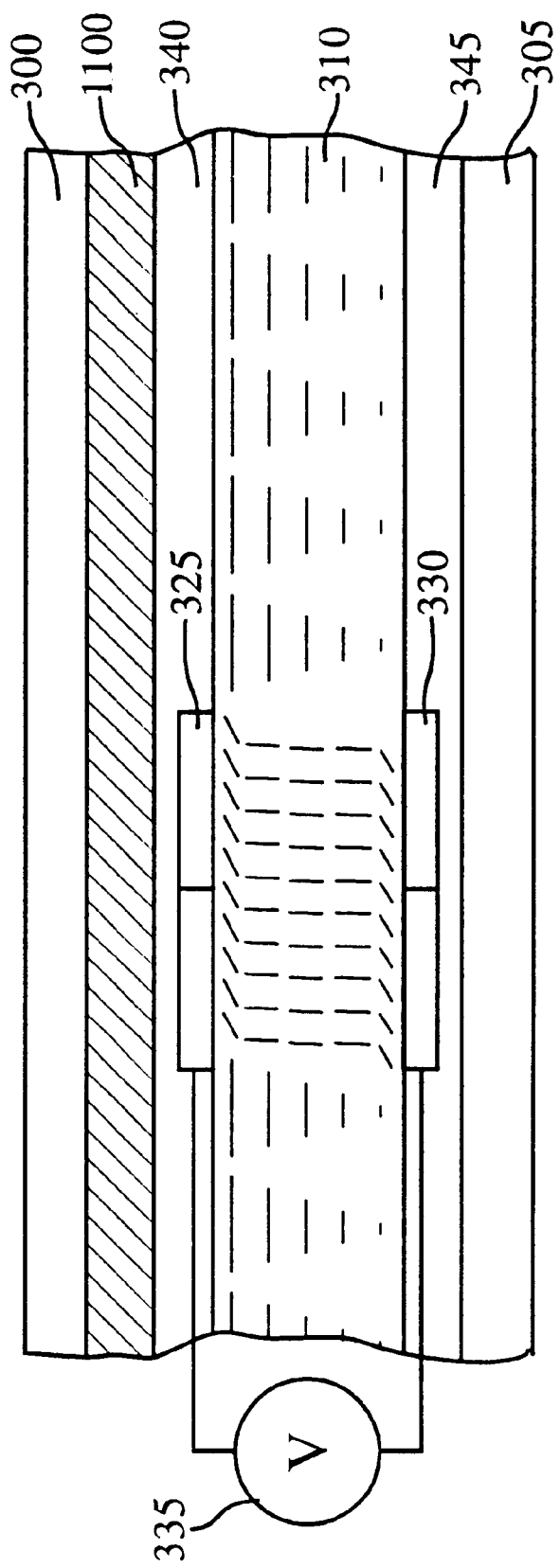

ORGANIC POLYMER O-PLATE COMPENSATOR FOR IMPROVED GRAY SCALE PERFORMANCE IN TWISTED NEMATIC LIQUID CRYSTAL DISPLAYS

This is a divisional of U.S. patent application Ser. No. 08/947,531, filed Jul. 30, 1997, which is a continuation of U.S. patent application Ser. No. 08/313,531, filed Sep. 30, 1994 (now abandoned), which is a continuation-in-part of U.S. patent application Ser. No. 08/223,251, filed Apr. 4, 1994 (now U.S. Patent No. 5,504,603), entitled "Optical Compensator for Improved Gray Scale Performance in Liquid Crystal Display."

TABLE OF CONTENTS

1. REFERENCES
2. BACKGROUND OF THE INVENTION
   2.1 LCD Technology Overview
   2.2 Normally White Twisted Nematic LCDs
   2.3 Normally White Twisted Nematic LCD Characteristics
      2.3(a) C-Plate Compensation
      2.3(b) Gray Scale Stability
      2.3(c) O-Plate Gray Scale Compensation
      2.3(d) O-Plate Technology
   2.4 Summary
3. SUMMARY OF THE INVENTION
4. BRIEF DESCRIPTION OF DRAWINGS
5. DETAILED DESCRIPTION OF SPECIFIC EMBODIMENTS
   5.1 Introduction
   5.2 Nematic Embodiment
   5.3 Smectic-C Substrate Aligned Embodiment
   5.4 Smectic-C Electric Field Alignment Embodiment
   5.5 Possible Variations
6. BIBLIOGRAPHY
7. CLAIMS
8. ABSTRACT

BACKGROUND OF THE INVENTION

This invention is concerned with the design of liquid crystal displays (LCDs) and, more particularly, with techniques for maximizing the field of view of such displays by maintaining a high contrast ratio and minimal variance in relative gray levels over a wide range of viewing angles. These goals are achieved through the fabrication and manufacture of LCDs using O-plate compensator technology.

LCD TECHNOLOGY OVERVIEW

Liquid crystals are useful for electronic displays because polarized light traveling through a liquid crystal layer is affected by the layer's birefringence, which can be changed by the application of a voltage across the layer. By using this effect, the transmission or reflection of light from an external source, including ambient light, can be controlled with much less power than is required for the luminescent materials used in other types of displays. As a result, liquid crystal displays are now commonly used in a wide variety of applications, such as, for example, digital watches, calculators, portable computers, and many other types of electronic equipment. These applications highlight some of the advantages of LCD technology including very long operational life in combination with very low weight and low, power consumption.

The information content in many liquid crystal displays is presented in the form of multiple rows of numerals or characters, which are generated by segmented electrodes deposited in a pattern on the display. The electrode segments are connected by individual leads to electronic driving circuitry. By applying a voltage to the appropriate combination of segments, the electronic driving circuitry controls the light transmitted through the segments.

Graphic and television displays may be achieved by employing a matrix of pixels in the display which are connected by an X-Y sequential addressing scheme between two sets of perpendicular conductors. More advanced addressing schemes, applied predominantly to twisted nematic liquid crystal displays, use arrays of thin film transistors to control driving voltages at the individual pixels.

Contrast and stability of relative gray scale intensities are important attributes in determining the quality of a liquid crystal display. The primary factor limiting the contrast achievable in a liquid crystal display is the amount of light which leaks through the display in the dark state. In addition, the contrast ratio of the liquid crystal device also depends on the viewing angle. The contrast ratio in a typical liquid crystal display is a maximum only within a narrow viewing angle centered near normal incidence and drops off as the angle of view is increased. This loss of contrast ratio is caused by light leaking through the black state pixel elements at large viewing angles. In color liquid crystal displays, such leakage also causes severe color shifts for both saturated and gray scale colors.

The viewing zone of acceptable gray scale stability in a typical prior art twisted nematic liquid crystal display is severely limited because, in addition to color shifts caused by dark state leakage, the optical anisotropy of the liquid crystal molecules results in large variations in gray level transmission, i.e., a shift in the brightness-voltage curve, as a function of viewing angle. The variation is often severe enough that, at extreme vertical angles, some of the gray levels reverse their transmission levels. These limitations are particularly important for applications requiring a very high quality display, such as in avionics, where viewing of cockpit displays from both pilot and copilot seating positions is important. Such high information content displays require that the relative gray level transmission be as invariant as possible with respect to viewing angle. It would be a significant improvement in the art to provide a liquid crystal display capable of presenting a high quality, high contrast image over a wide field of view.

FIGS. 1A and 1B show a conventional normal white, twisted nematic liquid crystal display 100 including a polarizer 105, an analyzer 110 with a polarization axis perpendicular to that of the polarizer 105, a light source 130, and a viewer 135.

In the normally white configuration of FIGS. 1A and 1B, a "nonselect" area 115 (no applied voltage) appears light, while a "select" area 120 (those which are energized by an applied voltage) appear dark. In the select area 120 the liquid crystal molecules tend to tilt and rotate toward alignment with the applied electric field. If this alignment perfect, all the liquid crystal molecules in the cell would be oriented with their long axes normal to the cell's major surface. This configuration is known as homeotropic alignment.

Because the liquid crystals used for twisted nematic displays exhibit positive birefringence, this arrangement, known as the homeotropic configuration, would exhibit the optical symmetry of a positively birefringent C-plate. As is well known in the art, a C-plate is a uniaxial birefringent plate with its extraordinary axis (i.e., its optic or c-axis) perpendicular to the surface of the plate (parallel to the direction of normally incident light). In the select state the liquid crystal in a normally white display would thus appear isotropic to normally incident light, which would be blocked by the crossed polarizers.

One reason for the loss of contrast with increased viewing angle which occurs in a normally white display is that a homeotropic liquid crystal layer will not appear isotropic to off-normal light. Light propagating through the later at off-normal angles appears in two modes due to the birefringence of the layer; a phase delay is introduced between those modes and increases with the incident angle of the light. This phase dependence on incidence angle introduces an ellipticity to the polarization state which is incompletely extinguished by the second polarizer, giving rise to light leakage. To correct for this effect, an optical compensating element must also have C-plate symmetry, but with negative birefringence ($n_e<n_o$). Such a compensator will introduce a phase delay opposite in sign to the phase delay caused by the liquid crystal layer, thereby restoring the original polarization state and allowing light passing through energized areas of the layer to be blocked more completely by the output polarizer. C-plate compensation, however, does not impact the variation of gray scale with viewing angle, which is addressed by the present invention.

FIG. 2 depicts the coordinate system which is used to describe the orientation of both liquid crystal and birefringent compensator optic axes. Light propagates toward the viewer 200 in the positive z direction 205 which, together with the x-axis 210 and the y-axis 215, form a right-handed coordinate system. Backlighting is provided, as indicated by the arrows 220, from the negative z direction. The polar tilt angle Θ 225 is defined as the angle between the liquid crystal's molecular optic axis ĉ 230 and the x-y plane, measured from the x-y plane. The azimuthal or twist angle Φ 235 is measured from the x-axis to the projection 240 of the optic axis into the x-y plane.

Normally White Twisted Nematic LCDs

FIG. 3 is a cross sectional schematic view of a prior art twisted nematic, transmissive type normally white liquid crystal display. The display includes a polarizer layer 300 and an analyzer layer 305, between which is positioned a liquid crystal layer 310, consisting of a liquid crystal material in the nematic phase.

It is convenient in describing the orientation of various compensation elements of the display to refer to a normal axis perpendicular to the display, which is depicted by a dashed line 370. In the case of a normally white display, the polarizer 300 (with a polarization direction in the plane of the drawing 315) and the analyzer 305 (with a polarization direction into the plane of the drawing 320) are oriented with their polarization directions at 90° to one another. (A polarizer 300 and an analyzer 305 both polarize electromagnetic fields. Typically, however, the term 'polarizer' refers to a polarizer element that is closest the source of light while the term 'analyzer' refers to a polarizer element that is closest the viewer of the LCD.) A first transparent electrode 325 and a second transparent electrode 330 are positioned on the glass plates 340 and 345 adjacent to opposite surfaces of the liquid crystal layer 310 so that a voltage can be applied, by means of a voltage source 335, across the liquid crystal layer. As is explained below, the inner surfaces of the glass plates 340 and 345, which are proximate to the liquid crystal layer 310, can be physically or chemically treated to affect the desired liquid crystal orientation, as by buffing.

As is well known in the LCD art (see, e.g., Kahn, "The Molecular Physics of Liquid-Crystal Devices," Physics Today, pp. 66–74, May 1982), when the inner surfaces of the plates 340 and 345 (the surfaces adjacent to the layer 310) are coated with a surface treatment for aligning the liquid crystal such as polyimide, buffed, and oriented with their buffed directions perpendicular, the director of the liquid crystal material, absent any applied electrical voltage, will tend to align with the buffed direction (known as the "rub direction") in the regions of the layer 310 proximate each of the plates 340 and 345. Furthermore, the orientation of the liquid crystal axis (i.e., the director) will twist smoothly with respect to the normal axis through an angle of 90° along a path in the layer 310 from the first major surface adjacent to the plate 340 (i.e., at the 310/340 interface) to the second major surface adjacent to the plate 345 (i.e., at the 310/345 interface).

In the absence of an applied electric field the direction of polarization of incoming polarized light will be rotated by 90° in traveling through the liquid crystal layer. When the glass plates and the liquid crystal layer are placed between crossed polarizers, such as the polarizer 300 and the analyzer 305, light polarized by the polarizer and traversing the display, as exemplified by the light ray 350, will thus be aligned with the polarization direction of the analyzer 320 and therefore will pass through the analyzer.

When a sufficient voltage is applied to the electrodes 325 and 330, however, the applied electric field causes the director of the liquid crystal material to tend to align parallel to the field. With the liquid crystal material in this state, light passed by the polarizer 300, as illustrated by the light ray 355, will be extinguished by the analyzer 305. Thus, an energized pair of electrodes will produce a dark region in the display, while light passing through regions of the display which are not subject to an applied field will produce illuminated regions. As is well known in the LCD display art, an appropriate pattern of electrodes, activated in selected combinations, can be utilized in this manner to display alphanumeric or graphic information. As explained further below, one or more compensator layers, such as the layers 360 and 365, may be included in the display to improve the quality of the display.

Normally White Twisted Nematic LCD Characteristics

FIG. 4 shows a calculated plot of liquid crystal director tilt as a function of position in a liquid crystal layer (where the cell gap has been normalized to unity) in a 90° twisted nematic cell. Typical distributions for molecular tilt angles when no voltage is applied (curve 400), under a topical select state voltage (curve 405), and under the application of several intermediate voltages chosen to yield linearly spaced gray levels (curves 410, 415, 420, 425, 430, and 435) are shown.

FIG. 5 is a related plot for the same cell depicting the calculated twist angle of the liquid crystal molecules as a function of position in the cell. When there is no applied voltage, the twist is distributed evenly throughout the cell (straight line curve 500). Under a fully select state voltage, the twist is distributed as shown by the external. S-shaped curve 505. The twist distributions for gray levels are shown by the intermediate curves between the two curves 500 and 505.

As illustrated by FIGS. 4 and 5, when the fully selected voltage is applied nearly all of the twist experienced by the liquid crystal molecules, and a substantial portion of the tilt, occurs in the central region of the cell. Because of this phenomenon, the continuous variation of molecular orientation within the cell can be separated into three regions, each of which is characterized by its own optical symmetry. Thus, the central regions 440 (FIG. 4) and 510 (FIG. 5) can be considered as nominally homeotropic in the fully selected state, approximating the properties of a C-plate. The regions 445 and 450 (FIG. 4) and 515 and 520 (FIG. 5), near each surface of the cell, behave as A-plates, each with its extraordinary axis aligned with the rub direction of the proximate substrate. Because there is essentially no twist in the molecules in the regions 445, 450, 515, and 520, the molecules are essentially aligned with the respective rub directions on either side of the liquid crystal layer. In addition, because the twist angle of the molecules in the regions 445 and 515 tends to be perpendicular to the twist angle of the molecules in the regions 450 and 520, the effect of these two regions on light traveling through the cell tends to be canceled, leaving the middle C-plate region to exert the dominant influence.

(a) C-Plate Compensation

As is well known in the art, a negative C-plate compensator is designed to correct for the angle dependent phase shift introduced by propagation through the central, approximately C-plate region of a LCD cell. Such a compensator is effective to the extent that the optical symmetry of the central region dominates the selected state of the liquid crystal cell, that is, the extent to which the molecules align with the applied field. This implies that negative C-plate compensation will work best when strong fields are used for the energized state as this makes the homeotropic approximation more nearly correct. The use of a C-plate has been demonstrated to significantly reduce the leakage of the dark state over an extended field of view, thus improving contrast and reducing color desaturation.

(b) Gray Scale Stability

While the use of a C-plate compensator may be used to improve contrast, it does not improve gray scale stability. The problem of maintaining constant gray scale luminance differences over the field of view relates substantially to the brightness level changes for levels assigned between the select (black for a normally white display) and nonselect (white for a normally white display) states. This phenomenon is generally depicted using transmission, or brightness, versus voltage (BV) electro-optic response curves for a display to which eight gray levels are assigned, from level 0 (the select black state) to level 7 (the nonselect white state). Gray levels between 0 and 7 are chosen by assigning them a set of voltages spaced linearly in brightness along the BV curve between the select and nonselect voltages.

FIG. 6 is a plot of calculated BV (transmission versus drive voltage) curves for a normally white. 90° twisted nematic display as the horizontal viewing angle varies from 0° to 40° in 10° increments while the vertical viewing angle remains fixed at 0°. (The change in the BV curves with horizontal angle is, to first order, independent of whether the horizontal deviation is to the left or right.) Note that the regions of each curve over which gray levels would be selected almost overlie one another for the various horizontal angles. This means that gray levels chosen to be linearly spaced at zero degrees would remain very nearly linear at even high horizontal viewing angles.

The gray scale stability problem appears most predominantly when the vertical viewing angle varies. This is illustrated in FIG. 7, which shows a series of BV curves for a normally white, 90° twisted nematic display as the vertical viewing angle varies from −10° to +30° while the horizontal viewing angle remains fixed at 0°. It can be observed that for angles below 0° (measured from the normal) the BV curves shift to the right (higher voltage), and fall monotonically from their maximum but fail to reach zero.

For angles above normal, the curves shift to the left and develop a rebound after an initial minimum. These effects can be explained by considering the perspectives of viewers looking at the display from above, at, and below normal, as shown in FIG. 8. The critical feature to note is the relationship between the light traveling towards the viewer and the average liquid crystal director tilt at the center of a cell as voltage across the cell is increased.

For instance, as the voltage across a cell is increased, the average liquid crystal director in the center of the cell tilts from a parallel (with respect to the polarizer 300 and analyzer 305) orientation 815 toward a homeotropic one 825. For the viewer at normal incidence 800, retardation is highest at the nonselect state voltage and lowest at the select state voltage. When the retardation is nearly zero, the polarization state of the light is unchanged and it is blocked by the analyzer. Thus, the viewer sees a monotonic decrease in brightness to zero with increasing voltage.

Now consider the case of a positive vertical viewing direction (viewer above normal incidence 805). At some intermediate voltage the average director 820 points toward the viewer and the retardation is minimal. Here the viewer sees a brightness with voltage that initially decreases toward a minimum, at the point of minimal retardation, and then increases.

For the negative vertical viewing direction (viewer below normal incidence 810), the average director always presents a large anisotropy to a light ray, even at the highest voltage. The viewer therefore sees a monotonic decrease in brightness. Furthermore, the average liquid crystal director is always oriented at a larger angle with respect to the light ray for the below normal viewer 810 than it is for the normal incidence viewer 800. Therefore the anisotropy is greater and the brightness level is always higher in the negative vertical viewing direction than it is at normal incidence.

This dependency of an LCD's brightness versus viewing angle, has a profound impact on gray scale stability. In particular, the variation in gray level luminance versus vertical viewing angle can be extreme. (Note that a voltage chosen to yield a 50% gray level on the 0° curve in FIG. 7 yields a dark state on the +30° curve and approaches a fully white state at −10°.)

(c) O-Plate Gray Scale Compensation

To eliminate reversal of gray levels and improve gray scale stability, a birefringent O-plate compensator can be used. The O-plate compensator principle, as described in U.S. patent application Ser. No. 223,251 utilizes a positive birefringent material with its principal optic axis oriented at a substantially oblique angle with respect to the plane of the display (hence the term "O-plate"). "Substantially oblique" implies an angle appreciable greater than 0° and less than 90°. O-plates have been utilized, for example, with angles relative to the plane of the display between 30° and 60°, typically at 45°. Moreover, O-plates with either uniaxial or biaxial materials can be used. O-plate compensators can be placed in a variety of locations between a LCD's polarizer layer and analyzer layer.

In general, O-plate compensators may also include A-plates and/or negative C-plates as well as O-plates. As is well knows in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitably oriented organic birefringent materials.

A C-plate is a uniaxial birefringent laser with its extraordinary axis oriented perpendicular to the surface of the layer (parallel to the direction of normally incident light). Negatively birefringent C-plates may be fabricated by the use of uniaxially compressed polymers (See, e.g., Clerc et al., U.S. Pat. No. 4,701,028), stretched polymer films, or by the use of physical vapor deposited inorganic thin films (See, e.g., Yeh et al., U.S. Pat. No. 5,196,953), for example.

Oblique deposition of a thin film by physical vapor deposition is known to produce a film having birefringent properties (see, e.g., Motohiro and Taga. "Thin Film Retardation Plate by Oblique Deposition," Appl. Opt., Vol. 28. No. 3, pp. 2466–2482, 1989). By further exploiting the tilted orientation of the symmetry axis, the Motohiro process can be refined or enhanced to fabricate O-plates. Such components are by their nature biaxial. Their growth characteristics generate a microscopic columnar structure. The angles of the columns are tipped toward the direction of the arrival of a vapor stream. A deposition angle (measured from normal) of 76°, for example, results in a column angle of approximately 45°. The columns develop an elliptical cross section as the result of shadowing. This elliptical cross section gives rise to the biaxial character of the films. The birefringence, in magnitude and symmetry, is entirely attributable to the film microstructure and is referred to as form birefringence. These phenomena in thin films have been extensively studied and described by Macleod ("Structure-Related Optical Properties of Thin Films," J. Vac. Sci. Technol. A, Vol. 4, No. 3, pp. 418–422, 1986).

Uniaxial O-plate components can also be used to improve gray scale stability in twisted nematic liquid crystal displays. These may be fabricated by the use of suitable oriented organic birefringent materials. Those skilled in the art will recognize other means for fabricating both uniaxial and biaxial O-plates.

FIGS. 9 and 10 show one effect that an O-plate compensator layer can have on a normally white twisted nematic display. FIG. 9 shows the O-plate compensator layer's effect on the electro-optic response of the display at various horizontal viewing angles while FIG. 10 shows the O-plate compensator layer's effect on the display's vertical viewing angle. In this particular embodiment, one A-plate layer is positioned adjacent to the liquid crystal laser on both sides of the liquid crystal cell, and an O-plate layer is disposed between the polarizer layer and the A-plate/liquid crystal/A-plate layer stack. The variation in the BV curves versus both horizontal and vertical viewing angles are greatly reduced relative to the uncompensated case shown in FIGS. 6 and 7.

Elimination of gray scale reversal by the use of an O-plate compensator layer occurs in the following manner. In the positive vertical viewing direction, the retardation of the O-plate increases with viewing angle and tends to offset the decreasing retardation of the liquid crystal layer. When the viewer is looking down the axis of the average liquid crystal director, the presence of the O-plate prevents the layers between the two polarizers from appearing isotropic. Thus the rebound in the BV curve, shown in FIG. 7, is reduced and moved to higher voltages outside of the gray scale voltage range as shown in FIG. 10.

In the negative vertical viewing direction, the combination of an O-plate and an A-plate with their optic axes nominally at right angles tends to exhibit birefringence characteristics similar to that of a negative birefringence retarder with its optic axis oriented perpendicular to the plane containing the axes of the O-plate and A-plate. The direction of this retarder axis is nominally parallel to the orientation of the average liquid crystal in the central region of the cell when it is driven at a voltage between select and nonselect states. Thus, the presence of an O-plate oriented in this manner tends to cancel the birefringence of the liquid crystal layer, pulling the BV curve down, or equivalently, moving it toward the direction of lower voltages (i.e., left). A similar effect occurs in the positive and negative horizontal viewing directions as well.

The overall effect of introducing an O-plate compensator in this manner is to eliminate large rebounds in the gray scale voltage region and reduce the left-to-right shift in the BV curves as the viewing angle is varied from negative to positive vertical angles.

The orientations of the compensator optic axes can be carefully chosen so that the combined retardation effects cancel each other in the normal incidence viewing direction as well as minimize rebounds in the horizontal viewing direction. Combinations of more than one O-plate can be used as long as their orientations satisfy these requirements. Furthermore, negative C-plates can, for certain configurations, increase the contrast ratio at large fields of view, occasionally with some decrease in gray scale stability.

(d) O-Plate Technology

The liquid crystal layer, the compensator layer(s), the polarizer layer, and the analyzer layer may assume a variety of orientations relative to one another in a liquid crystal display. Some of the possible configurations which have been considered, and set out in U.S. patent application Ser. No. 223,251 are repeated in Table 1; where 'A' represents an A-plate, 'C' represents a C-plate. 'O' represents an O-plate, 'LC' represents the liquid crystal, and 'OxO' represents crossed O-plates. Crossed O-plates are adjacent O-plates with their azimuthal angles Φ 235 nominally crossed, one oriented between 0° and 90°, and the second oriented between 90° and 180°.

TABLE 1

Liquid Crystal Display Elements

| ← Toward Rear (Polarizer Side) | | | | | Toward Front (Analyzer Side) → | | |
|---|---|---|---|---|---|---|---|
| | | | | O | A | LC | |
| | | | | A | O | LC | |
| | | | | | O | LC | O | A |
| | | A | O | A | LC | | |
| | | | O | A | LC | A | |
| | | O | A | C | LC | | |
| | | | O x O | A | LC | | |
| | | A | O x O | A | LC | | |
| | | | | A | LC | O x O | A |
| | A | O | A | C | LC | | |
| | | | A | O | LC | O | A |
| | | A | O | C | LC | C | O |
| | | A | O | C | LC | C | O | A |
| | | C | A | O | LC | O | A | C |

The projections of the principal axes onto the plane of the display with respect to the liquid crystal director orientation can vary with the embodiment. In some cases, for example with two O-plates, the O-plate axis projections are at 45° with respect to the average liquid crystal director orientation near the center of the liquid crystal cell, while in others, the O-plate axis projection is substantially parallel with that of the liquid crystal director.

Crossed O-plate (OxO) designs that are farther compensated with A-plates provide additional design flexibility. The choice of A-plate value is not critical as such designs can be adjusted by varying the relative orientations of the A-plates. Thus, it is possible to generate desired solutions with commercially available A-plate retardation values.

The flexibility which an O-plate compensation scheme offers the display designer allows tailoring of performance to specific display product requirements. It is possible, for example, with simple configuration and parameter modifications to achieve isocontrast optimized for left or right viewing, isocontrast optimized for extreme vertical angle viewing, or isocontrast optimized for viewing at both large left and right angles above normal viewing. It is also possible to adjust the configuration and parameters to improve both the contrast and gray scale stability over a specified field of view, or to further optimize one at the expense of the other. Furthermore, a negatively birefringent A-plate may be substituted for a positively birefringent A plate. In this case, the negatively birefringent A-plate would be oriented with its extraordinary axis perpendicular to the orientation appropriate for a positively birefringent A-plate. As would be understood by one skilled in the art of liquid crystal display design additional changes would also be required in the other components of the compensator to optimize performance when a negative A-plate is used.

Summary

When viewed at an angle near the normal to its surface, a twisted nematic liquid crystal display provides high quality output, but at large viewing angles the image tends to degrade and exhibit poor contrast and gray scale nonuniformity. This occurs because the phase retardation effect of the liquid crystal material on light passing through it inherently varies with the inclination angle of the light, leading to a lower quality image at large viewing angles. By introducing one or more optical compensating elements in conjunction with the liquid crystal cell, however, it is possible to substantially correct for the undesirable angular effects and thereby maintain higher contrast and stable relative gray scale intensities at larger viewing angles than otherwise possible.

It is the goal of this invention to describe a positively birefringent O-plate compensator and method to manufacture the same, that makes possible a significant improvement in the gray scale properties and contrast ratios of liquid crystal displays over a wide range of viewing angles.

SUMMARY OF THE INVENTION

The compensator design of this invention, which includes a positively birefringent O-plate layer, makes possible a significant improvement in the gray scale properties and contrast ratios of liquid crystal displays (LCDs) over a wide range of viewing angles.

An O-plate compensator comprising an organic liquid crystal polymer, and methods for fabricating the same, are disclosed. The compensator is a uniaxial birefringent thin film with its extraordinary axis oriented obliquely with respect to the surface of the film. (It is noted that the birefringent thin film could be weakly biaxial.) The oblique orientation of the liquid crystal director, which is parallel to the film's extraordinary axis, is achieved by casting an organic thin film onto a surface specially prepared for orienting liquid crystals, such as obliquely deposited SiO, mechanically rubbed alignment agents. The film can either be cast from a solution of the liquid crystal polymer or from a reactive liquid crystal monomer having a nematic phase. Any solvent that may be used during the fabrication process is evaporated off and the organic thin film is held at a temperature in its nematic phase. If a reactive monomer is used, the film is then photopolymerized. Alternative embodiments of an organic O-plate include the use of smectic-A and smectic-C materials. Fabrication techniques employing these materials are described.

BRIEF DESCRIPTION OF DRAWINGS

FIG. 11 is an illustrative liquid crystal display employing an organic thin film O-plate compensator layer in accordance with the invention.

DETAILED DESCRIPTION OF SPECIFIC EMBODIMENTS

Several illustrative embodiments of the invention are described below. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

Introduction

FIG. 11 shows an illustrative embodiment of a liquid crystal display (LCD) system in accordance with the invention, that uses a single O-plate compensator 1100 disposed between a polarizer 300 and a liquid crystal layer 310. The O-plate layer 1100 comprises a positively birefringent liquid crystal polymer layer having an optical symmetry axis oriented at an angle, relative to the surface of the liquid crystal polymer layer 310, of approximately 20° to 70°. Alternatively, the O-plate compensator layer could be located between a liquid crystal layer 310 and an analyzer 305, or in both locations.

The decision as to where to place the O-plate compensator is purely a design choice and is, in general, based on the optical requirements of the display being compensated and on the manufacturing and cost constraints of the display system.

In general, compensators may also include A-plates and/or negative C-plates as well as O-plates. As is well known in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitable oriented organic birefringent materials.

Nematic Embodiment

Figure 1A:
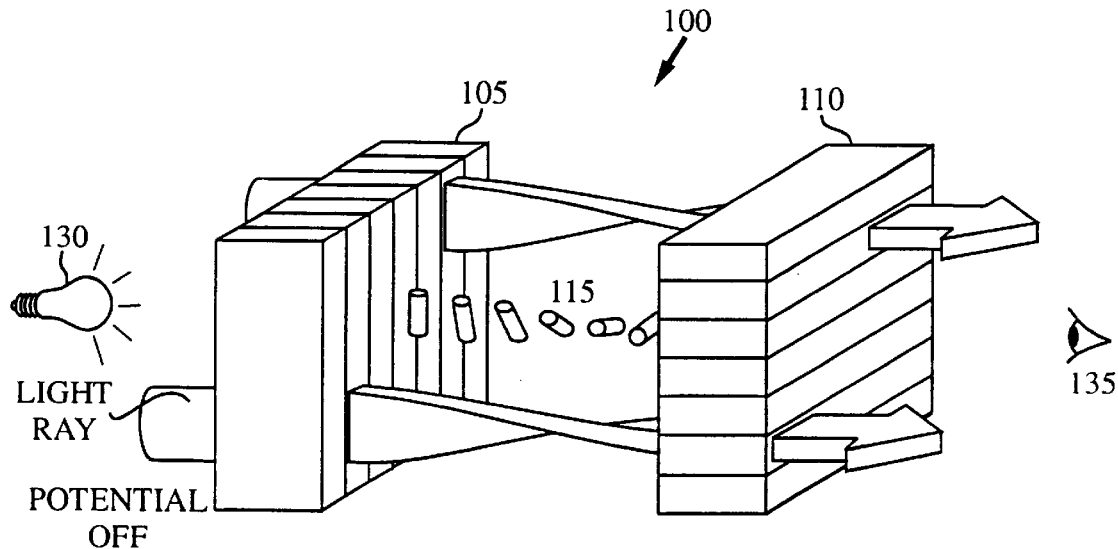
FIG. 1 shows, in overview, the operation of a normally white, 90° twisted nematic liquid crystal display.
Figure 1B:
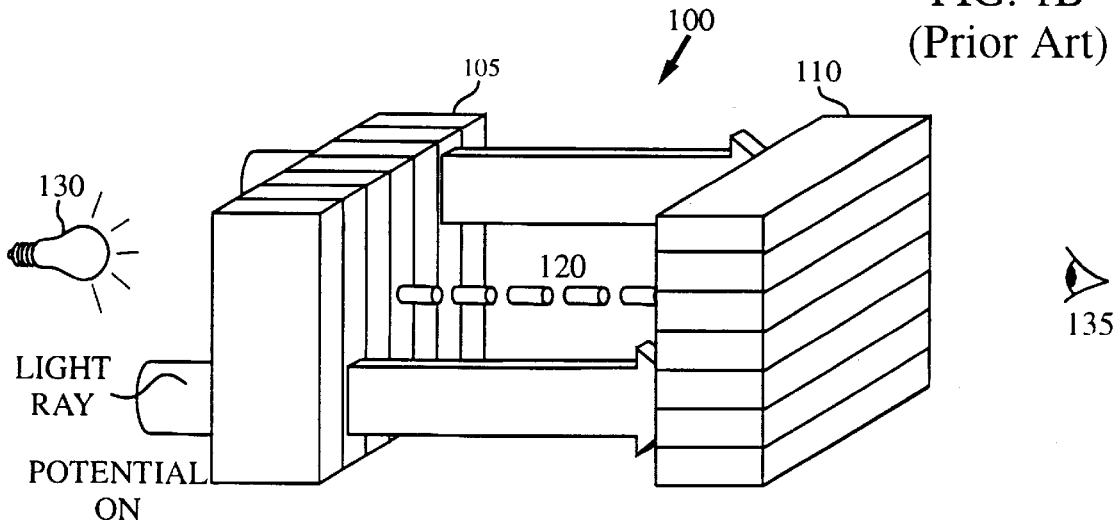
Figure 2:
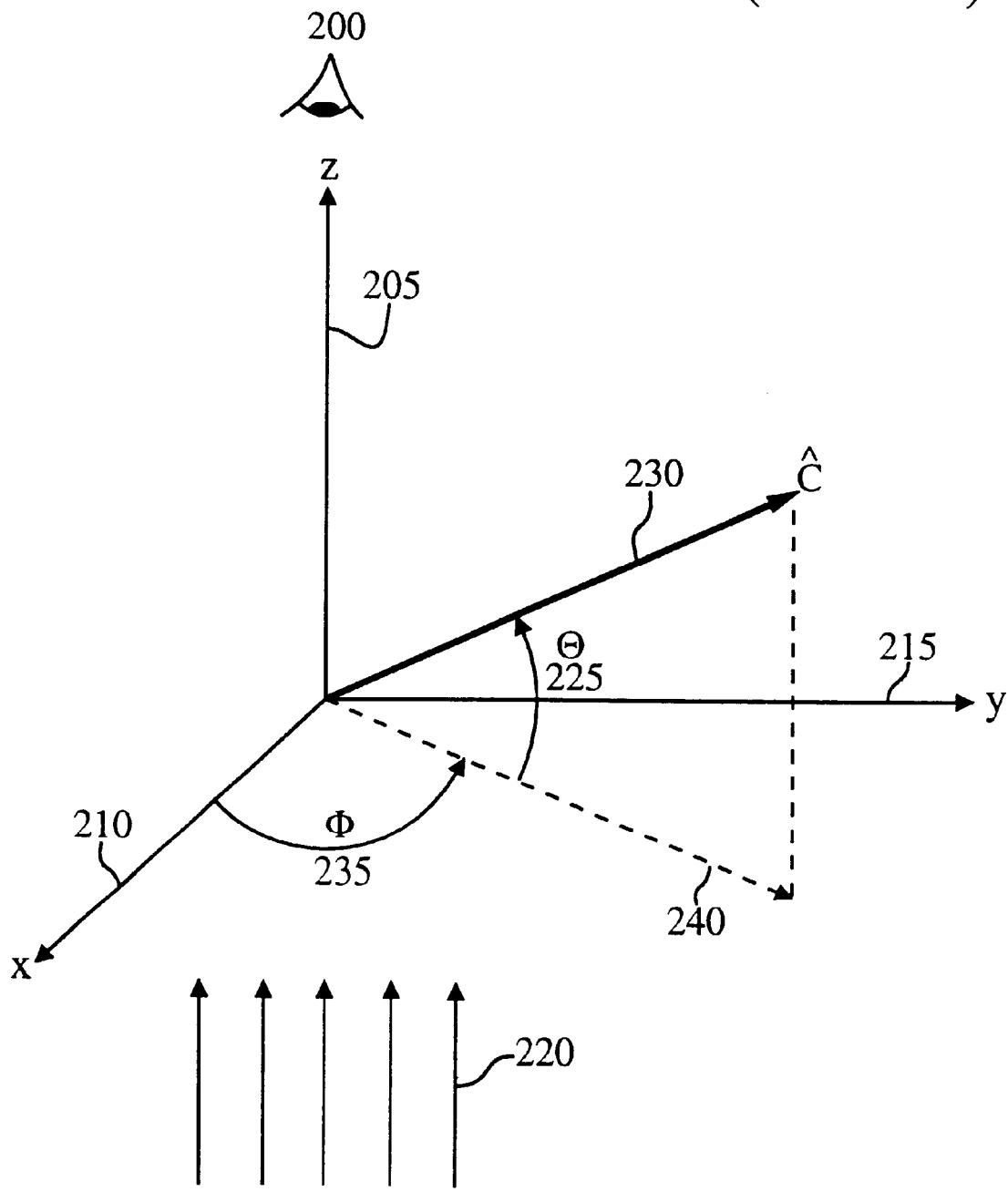
FIG. 2 depicts the coordinate system that is used to specify component orientations in the description of this invention.
Figure 3:
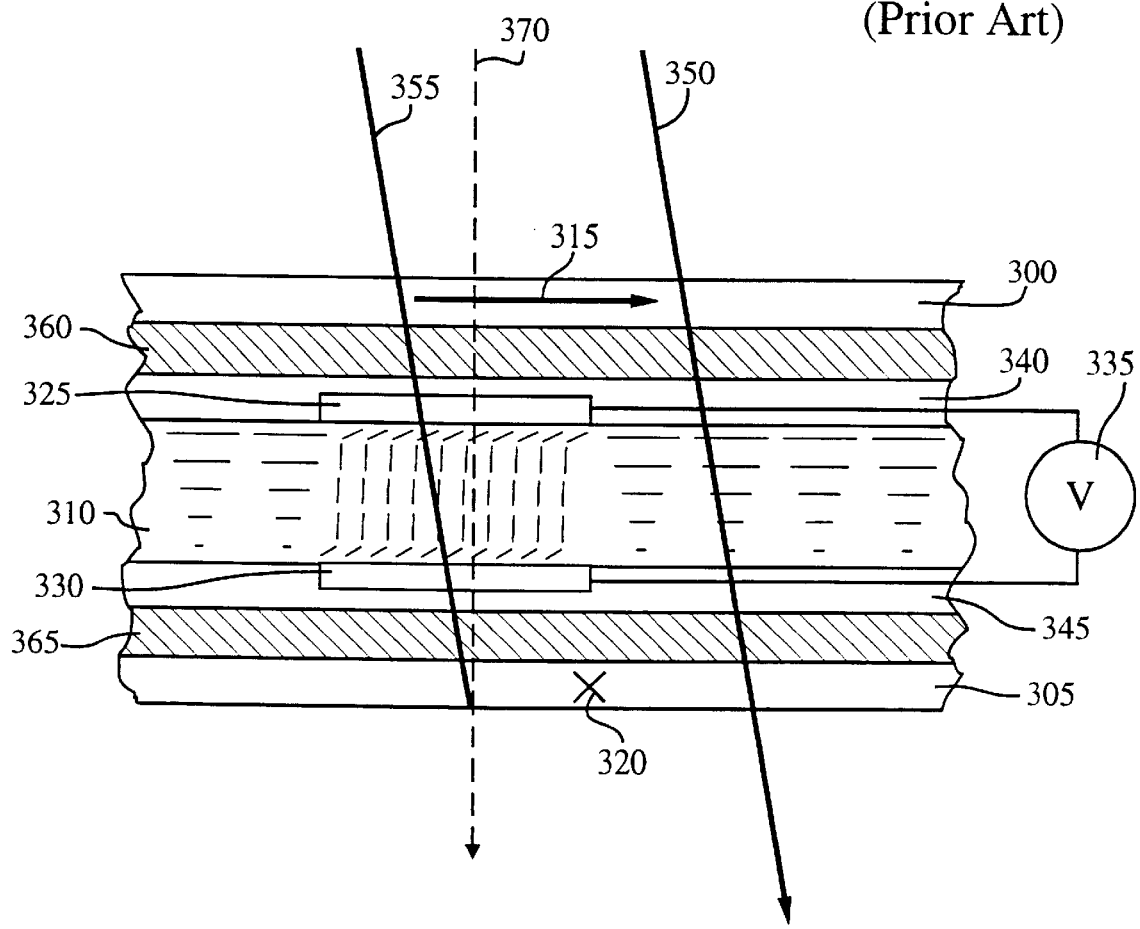
FIG. 3 is a cross sectional schematic view of a 90° twisted nematic, transmissive type normally white liquid crystal display.
Figure 4:
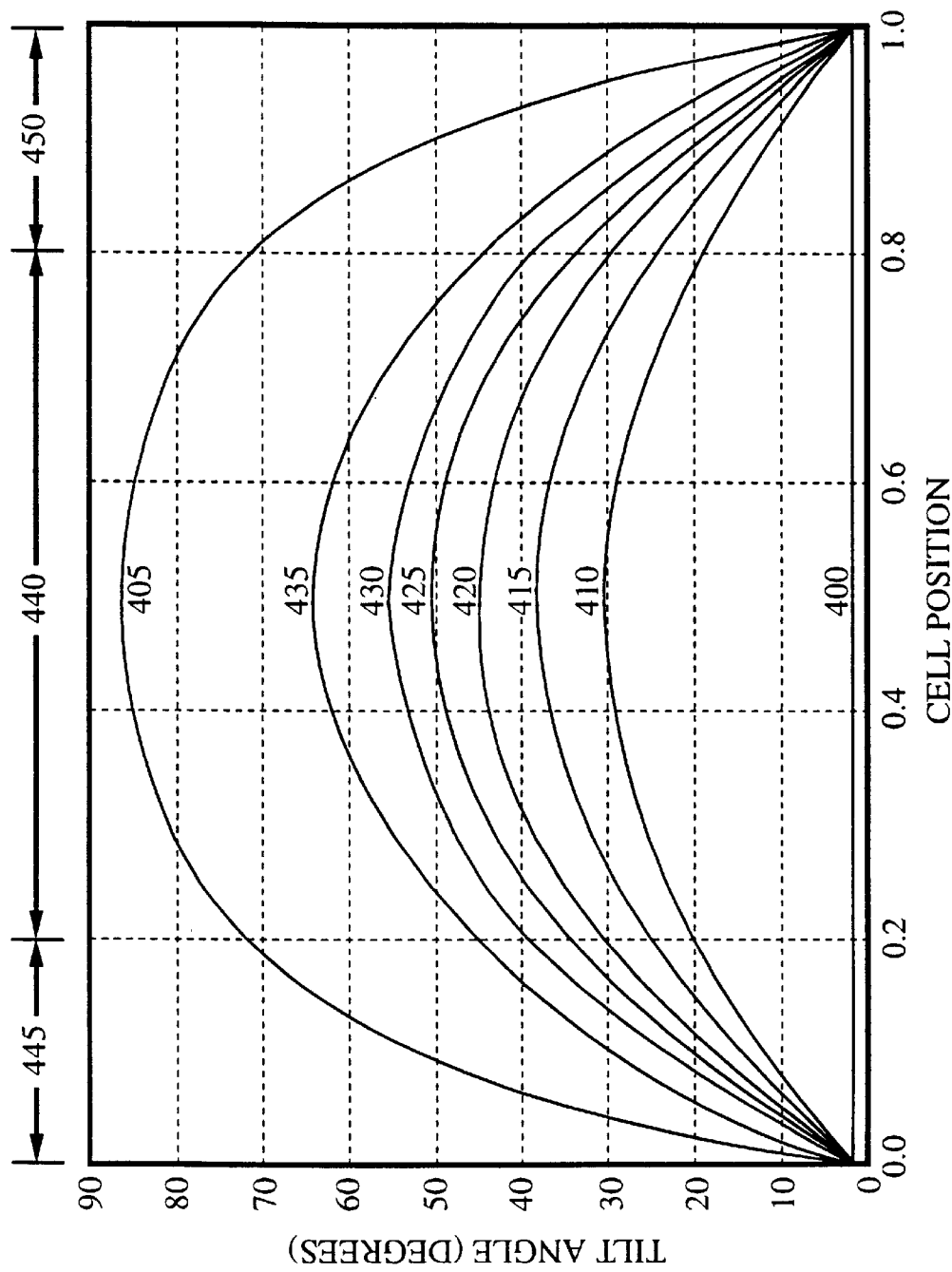
FIG. 4 is a plot of the tilt angle of the director (in degrees along the vertical axis) as a function of position (as a fraction of the depth along the horizontal axis) in a 90° twisted nematic liquid crystal cell.
Figure 5:
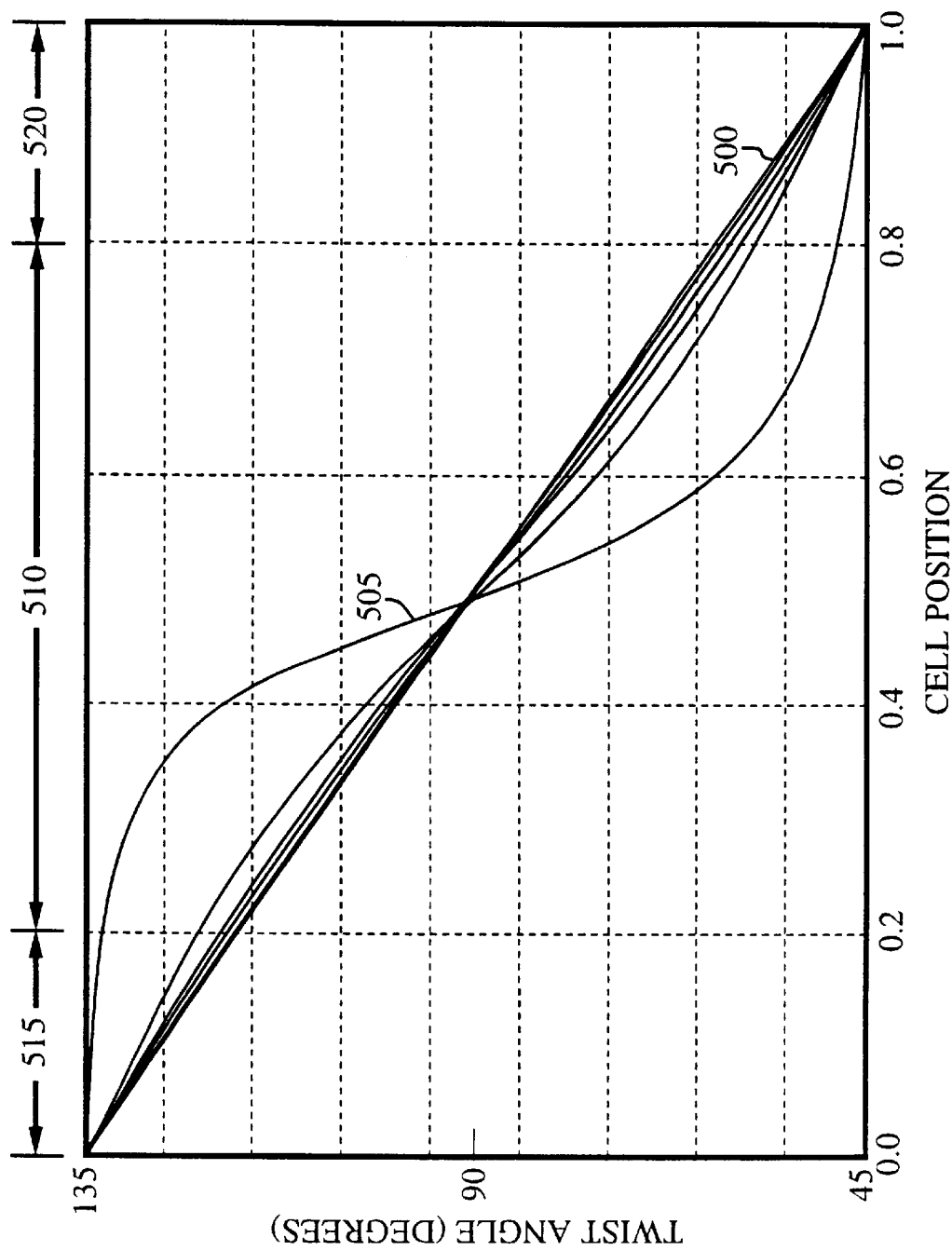
FIG. 5 is a related plot for the cell shown in FIG. 4, depicting the twist angle of the liquid crystal molecules as a function of their position in the cell.
Figure 6:
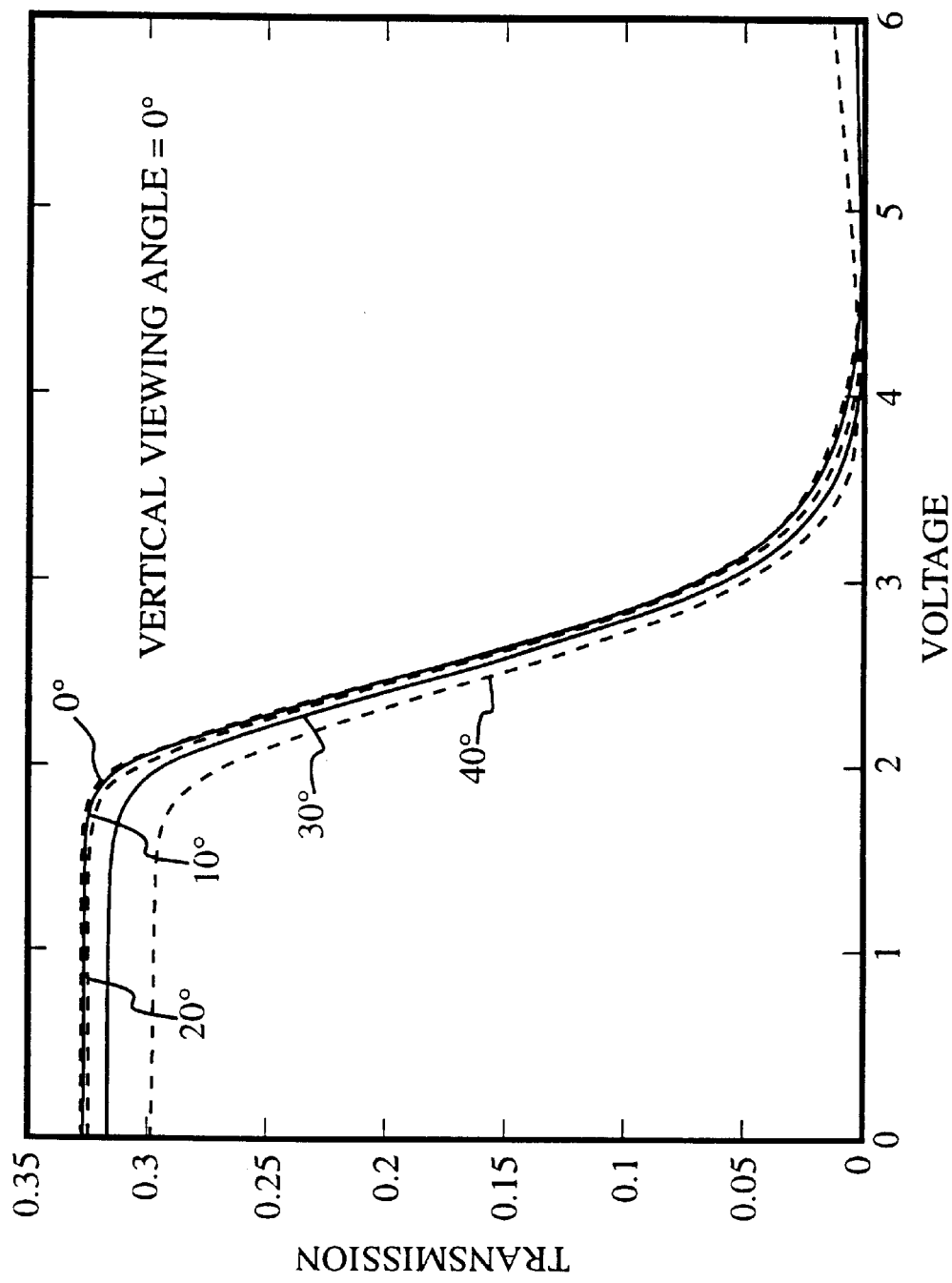
FIG. 6 is a plot of calculated brightness vs. voltage (BV) electro-optic curves at a variety of horizontal viewing directions for a typical twisted nematic display without the benefit of O-plate gray scale compensation.
Figure 7:
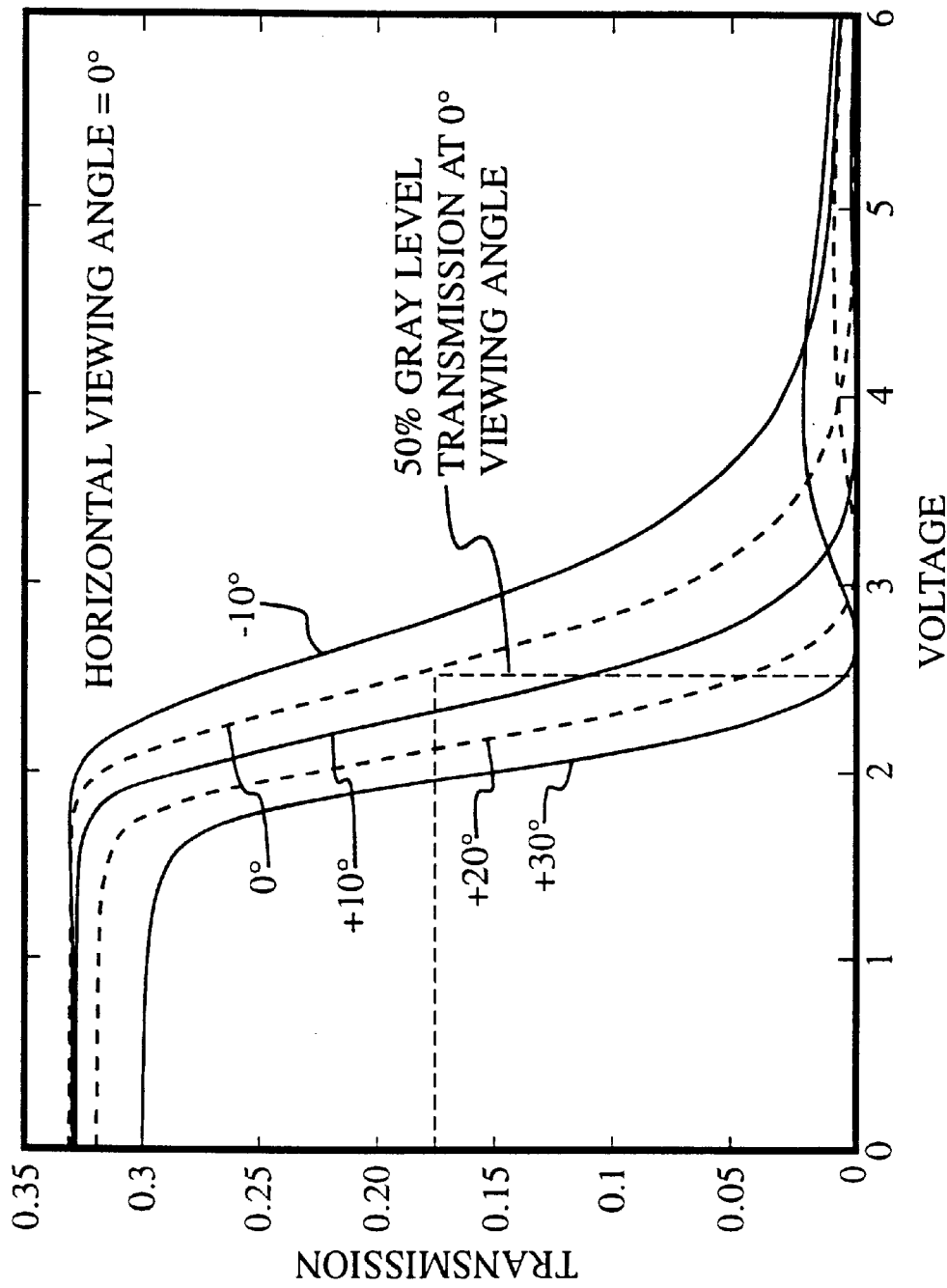
FIG. 7 is a plot of calculated brightness vs. voltage (BV) electro-optic curves at a variety of vertical viewing directions for a typical twisted nematic display without the benefit O-plate gray scale compensation.
Figure 8:
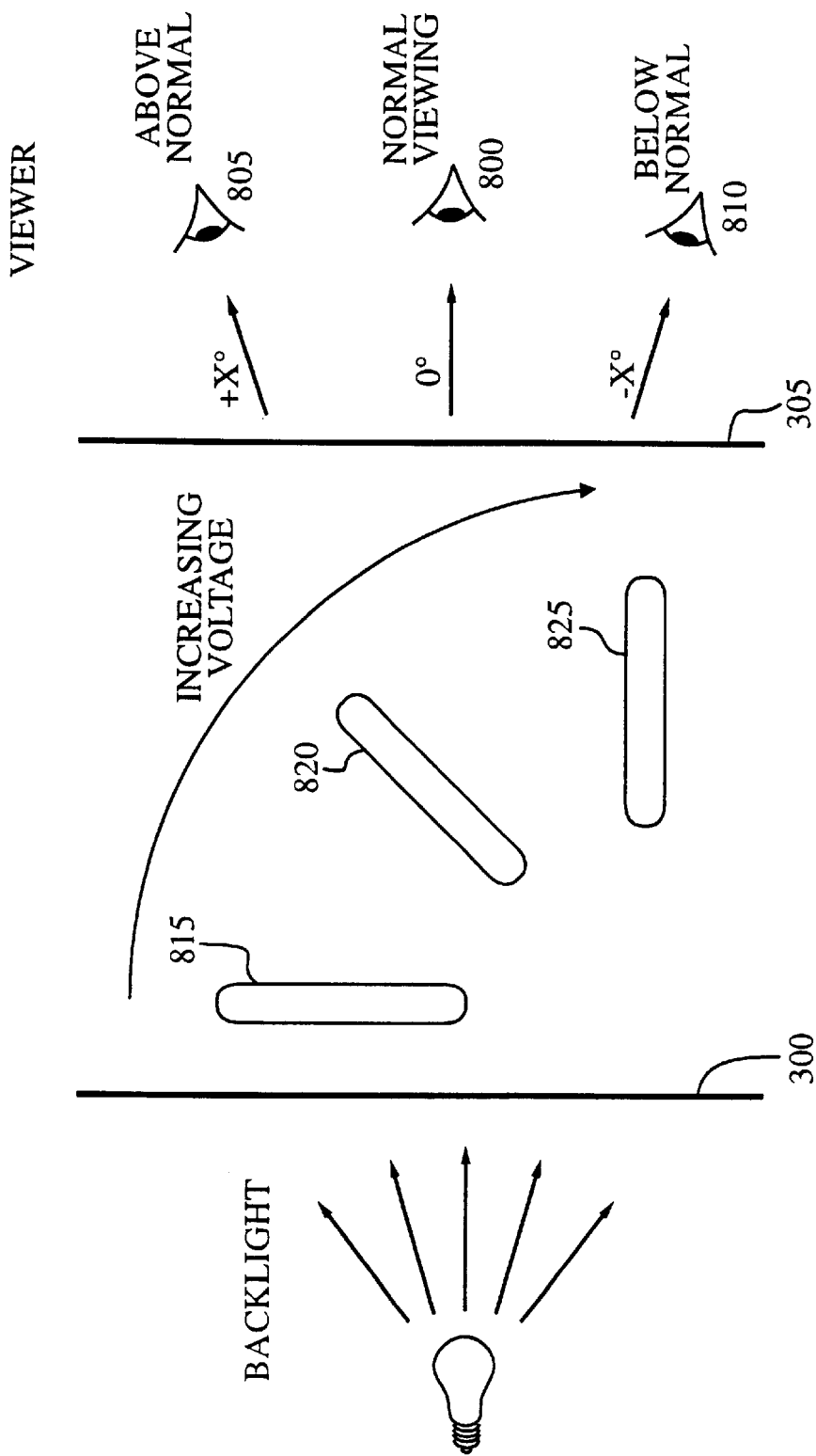
FIG. 8 is an illustration of the viewer's perspective relative to the average director orientation of a liquid crystal.
Figure 9:
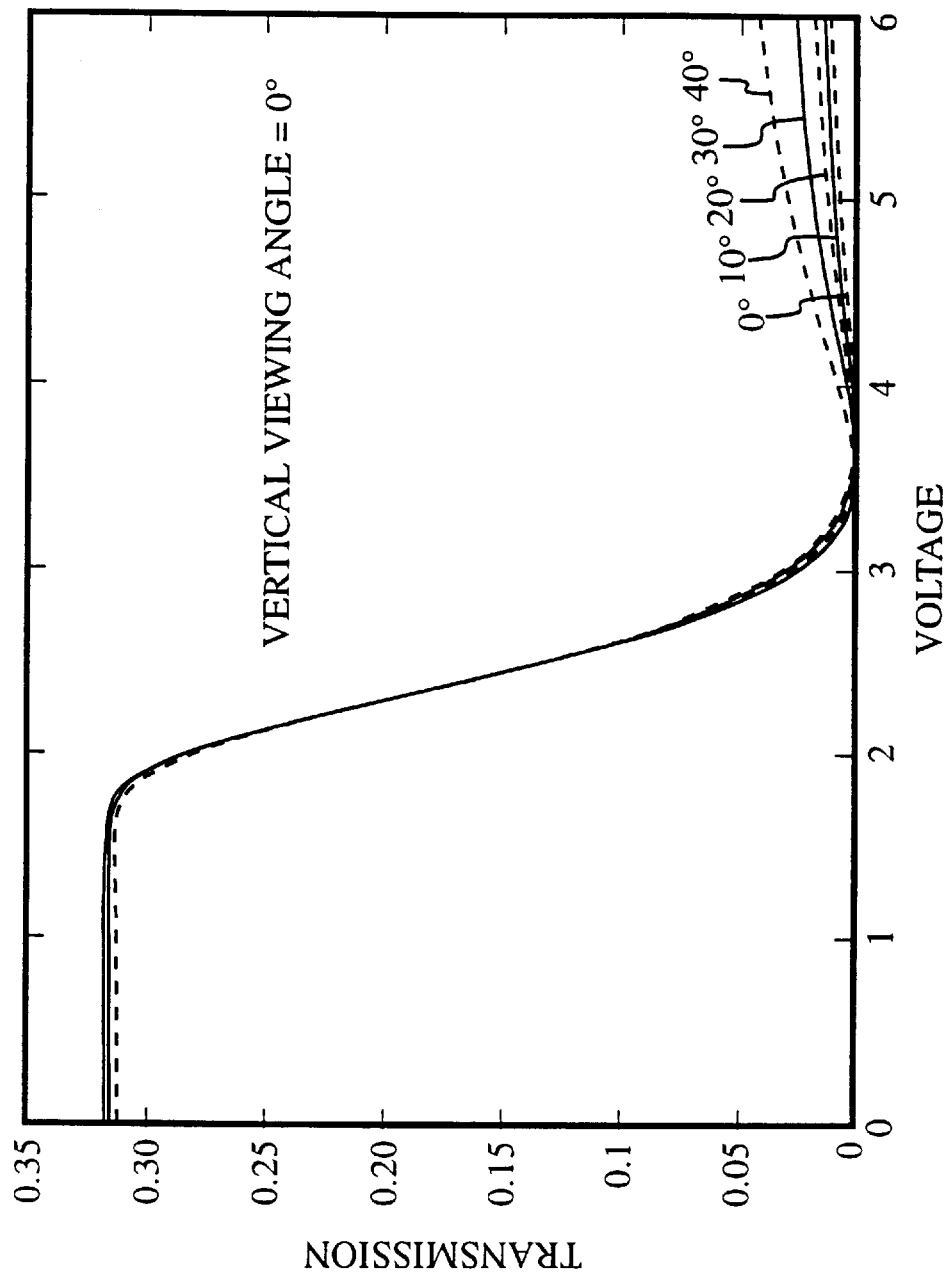
FIG. 9 show calculated brightness vs. voltage electro-optic curves for a normally white, twisted nematic liquid crystal display, at a variety of horizontal viewing directions having the benefit of O-plate compensation in accordance with the invention.
Figure 10:
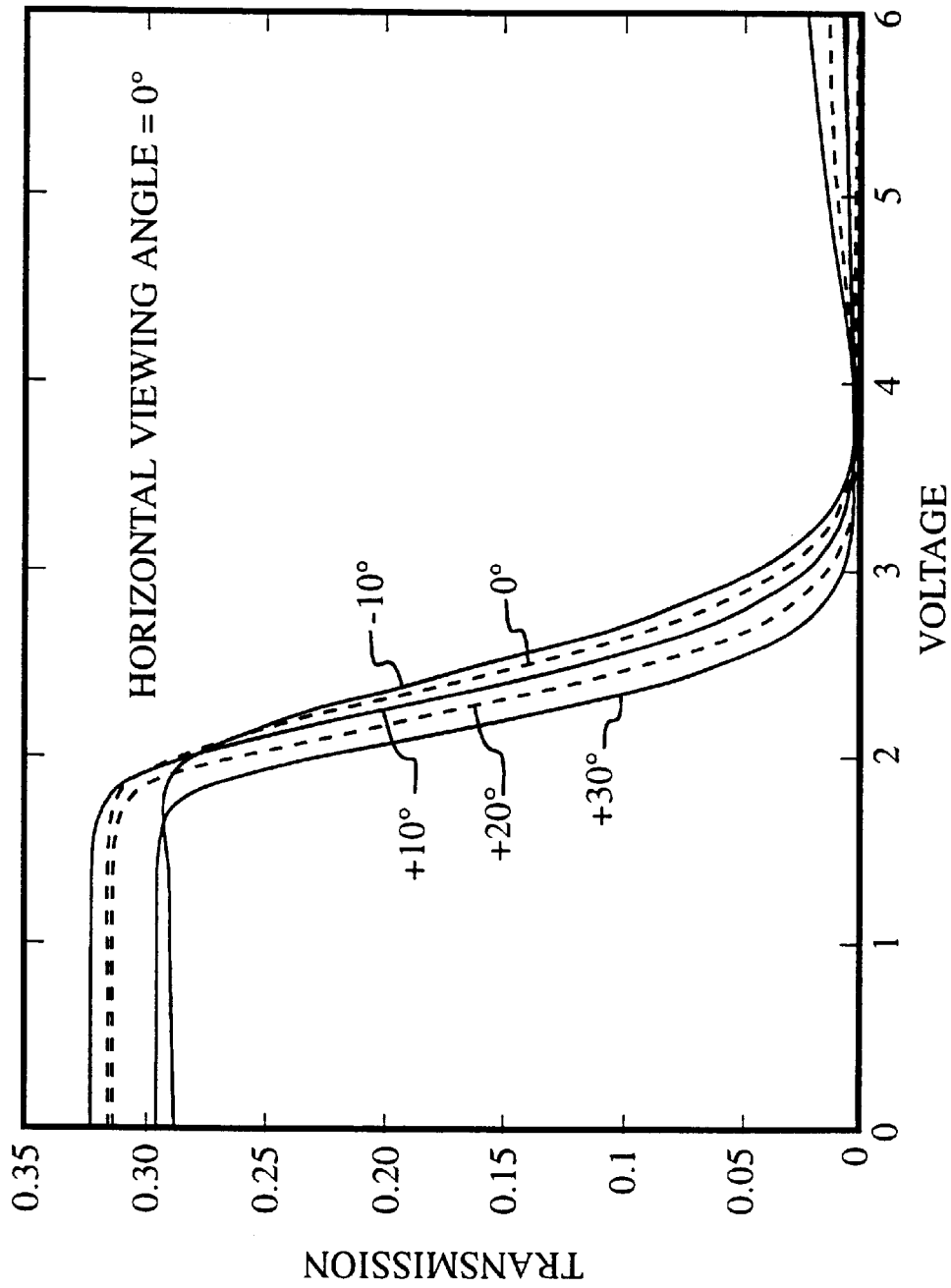
FIG. 10 show calculated brightness versus voltage electro-optic curves for a normally white, twisted nematic liquid crystal display, at a variety of vertical viewing directions having the benefit of O-plate compensation in accordance with the invention.
Figure 12A:
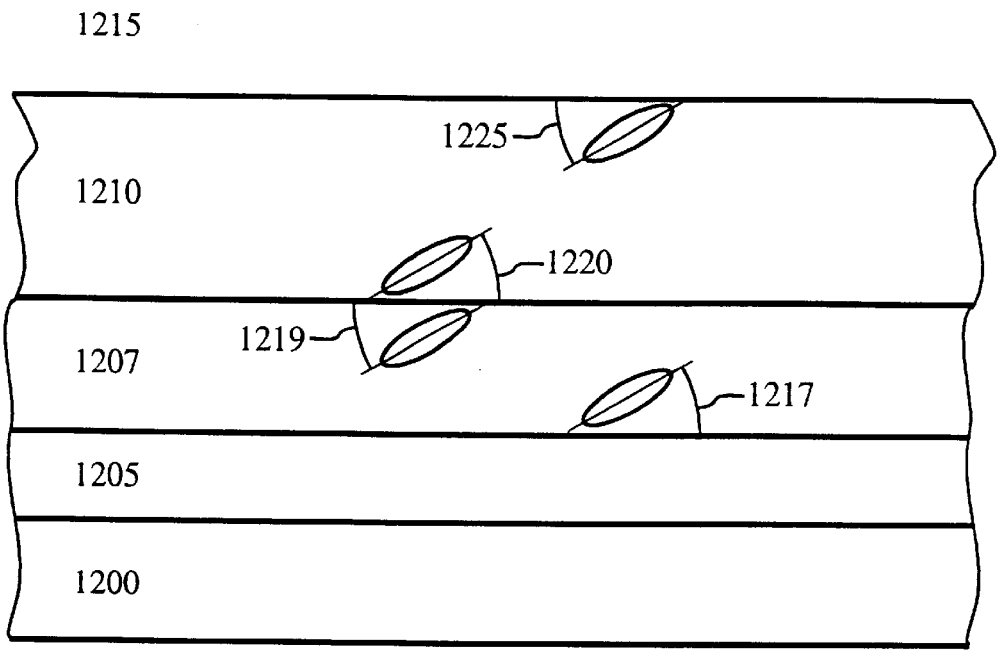
FIG. 12A is an illustrative embodiment of the invention using a nematic liquid crystal material.

Another illustrative embodiment, shown in FIG. 12A, shows a rigid glass substrate 1200, an alignment layer 1205, a polymerizable high pretilt liquid crystal monomer layer 1207 having a nematic phase, a high pretilt liquid crystal/alignment layer interface 1207/1205, a polymerizable O-plate liquid crystal monomer layer 1210 having a nematic phase, a liquid crystal O-plate/high pretilt liquid crystal layer interface 1210/1207, an air layer 1215, and a liquid crystal/air interface 1210/1215. The liquid crystal is comprised of polymerizable monomeric compounds and includes approximately 0.5% of Irgacure-651, a photoinitiator. Furthermore, the liquid crystal has a temperature dependent tilt angle at the liquid crystal/air interface 1210/1215 of approximately 40°.

The alignment layer 1205 is produced by coating a surface of the substrate 1200 with a polyimide material that produces a low liquid crystal tilt angle. The alignment surface is then rubbed to produce a temperature-dependent polar tilt angle 1217 at the high pretilt liquid crystal/alignment layer interface 1207/1205 of approximately 8° and a uniform specified azimuthal tilt direction. The liquid crystal tilt angle 1217 may be in the range 5°–20°.

Figure 12B:
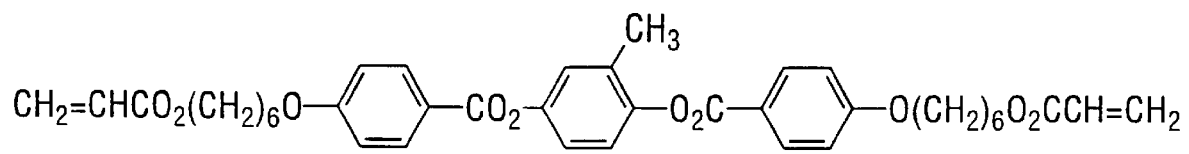
FIG. 12B shows the chemical structure of C6M, a conventional liquid crystal monomer.

A thin film of the liquid crystal monomer 1207 is produced on the alignment layer 1205 by the use of spin coating from a solution of the liquid crystal in a solvent. Other methods of producing thin films of organic liquids include, for example, dip, meniscus and slot-die coating. The chemical structure of the phenyl diester diacrylate liquid crystal monomer, known conventionally as C6M, is shown in FIG. 12B. The concentration of C6M is approximately 8.5%. The solvent is monochlorobenzene. Finally, the coating solution includes approximately 0.05% of Irgacure-651, a photoinitiator. As would be obvious to those skilled in the art, other materials could be substituted for C6M, Irgacure-651 and monochlorobenzene. It is believed that the above cited concentrations could vary within the range of solubility of the solutes.

After the film is produced, the solvent is evaporated off and the temperature of the liquid crystal layer 1207 is adjusted to produce a thin film of the liquid crystal material in the nematic phase. Next the liquid crystal film is illuminated with ultraviolet light (actinic radiation) at a wavelength of approximately 360 nanomenters (nm) to achieve a total exposure that is sufficient to polymerize the monomer to a polymeric film in which the order of the liquid crystal phase is preserved—typically 4–10 J/cm$^2$.

Other possible alignment layer materials could be substituted for layers 1205 and 1207 to give approximately 40° pretilt angle. Such materials could include, for example, mixtures of homogeneous and homeotropic alignment materials that are then rubbed.

A thin film of the liquid crystal monomer 1210 is produced on the polymerized high pretilt liquid crystal layer 1207 by the use of a spin coating.

After coating, the liquid crystal monomer layer 1210 is heated to a temperature within its nematic range that produces a uniform polar tilt angle 1220 of 40° and a uniform azimuthal tilt direction, at the liquid crystal O-plate/high pretilt liquid crystal layer interface 1210/1207, over the entire surface of the alignment layer 1205. The goal is to achieve nominally the same tilt angle (1220) at the substrate/liquid crystal interface and the liquid crystal/air interface (1225). Since there is no preferred azimuthal orientation of the liquid crystal at the liquid crystal/air interface, the orientation at this interface is determined by the azimuthal orientation of the liquid crystal O-plate/high pretilt liquid crystal layer interface 1210/1207. Next, the liquid crystal monomer film is illuminated with ultraviolet light (actinic radiation) at a wavelength of approximately 360 nm that is sufficient to polymerize the monomer to a polymeric film in which the order of the liquid crystal phase is preserved, typically 4–10 J/cm$^2$. The nematic order that exists in the liquid crystalline phase of the monomer is preserved in the polymer film that is produced by photopolymerization.

The purpose of the high pretilt liquid crystal layer 1207 is to increase the pretilt angle of the liquid crystal O-plate layer 1210 to approximately 40° without altering its azimuthal orientation. This occurs because the intrinsic nematic/air tilt angle 1219 and 1225 of the C6M liquid crystal is approximately 40°. As long as the thickness of high pretilt liquid crystal layer 1207 is greater than approximately 100 nm, the liquid crystal molecules Will undergo a continuous splay/bend deformation from the approximately 8° pretilt angle at the high pretilt liquid crystal/alignment layer interface 1207/1205, to the 40° nematic/air tilt angle 1219. The nematic order that exists in the liquid crystalline phase of the monomer is preserved in the polymer film that is produced by photopolymerization.

In light of these procedures, the liquid crystal molecules in the liquid crystal O-plate layer 1210 align at the liquid crystal O-plate/polymerized high pretilt liquid crystal layer interface 1210/1207 with a 40° pretilt angle 1220 (approximately the same as the angle of the adjacent nematic/air tilt angle 1219). Since the same material is used for both the liquid crystal O-plate layer 1210 and the high pretilt liquid crystal layer 1207, the nematic/air tilt angle 1225 will have approximately the same value as the liquid crystal pretilt angle 1220, and the tilt angle of the liquid crystal O-plate layer 1210 will be uniform across the thickness of the layer. Furthermore, the surface of the polymerized high pretilt liquid crystal layer 1207 exhibits good wetting properties by the liquid crystal molecules in the liquid crystal O-plate layer 1210.

In most applications the liquid crystal O-plate layer 1210 is much thicker (typically>1.0 micron) than the high pretilt liquid crystal layer 1207. Therefore, the contribution of the high pretilt liquid crystal layer 1207 to the overall phase retardation characteristics of the O-plate layer 1100 is negligible. The result of this process is a thin film of liquid crystal polymer 1210 that is positively birefringent and has a symmetry axis that is oriented at a polar tilt angle of approximately 40°.

The liquid crystal O-plate layer/air tilt angle 1225 and the liquid crystal pretilt angle 1220 may be different by as much as approximately 60°. The liquid crystal O-plate layer 1210 may then exhibit a splay/bend deformation between the liquid crystal O-plate/high pretilt liquid crystal layer interface 1210/1207 and the liquid crystal O-plate/air interface 1210/1215. Also, the liquid crystal O-plate layer 1210 may exhibit azimuthal twist, by incorporation of a chiral additive or use of a chiral polymerizable liquid crystal monomer or a chiral liquid crystal polymer.

Alternatively, if the liquid crystal material is a fluid at room temperature, a thin film layer of this material can then be deposited directly on the high pretilt liquid crystal layer 1207.

In another alternative embodiment, the nematic liquid crystal material 1210 could be replaced with a polymerizable smectic-A liquid crystal monomer material. The anchoring energy of a smectic-A liquid crystal material at the liquid crystal O-plate/high pretilt liquid crystal layer interface 1210/1207 is significantly higher than that at the liquid crystal/air interface 1210/1215. Furthermore, the bend deformation elastic constant of a smectic-A phase material is very high. This means that the orientation of the liquid crystal director in the bulk film is uniform and is determined substantially by the tilt angle 1220 at the liquid crystal O-plate/high pretilt liquid crystal layer interface 1210/1205. The benefit of using polymerizable smectic-A materials in this process is that the polar tilt angle of the resulting liquid crystal polymer film is insensitive to the tilt angle 1225 of the liquid crystal monomer at the liquid crystal/air interface 1210/1215.

Smectic-C Substrate Aligned Embodiment

Figure 13:
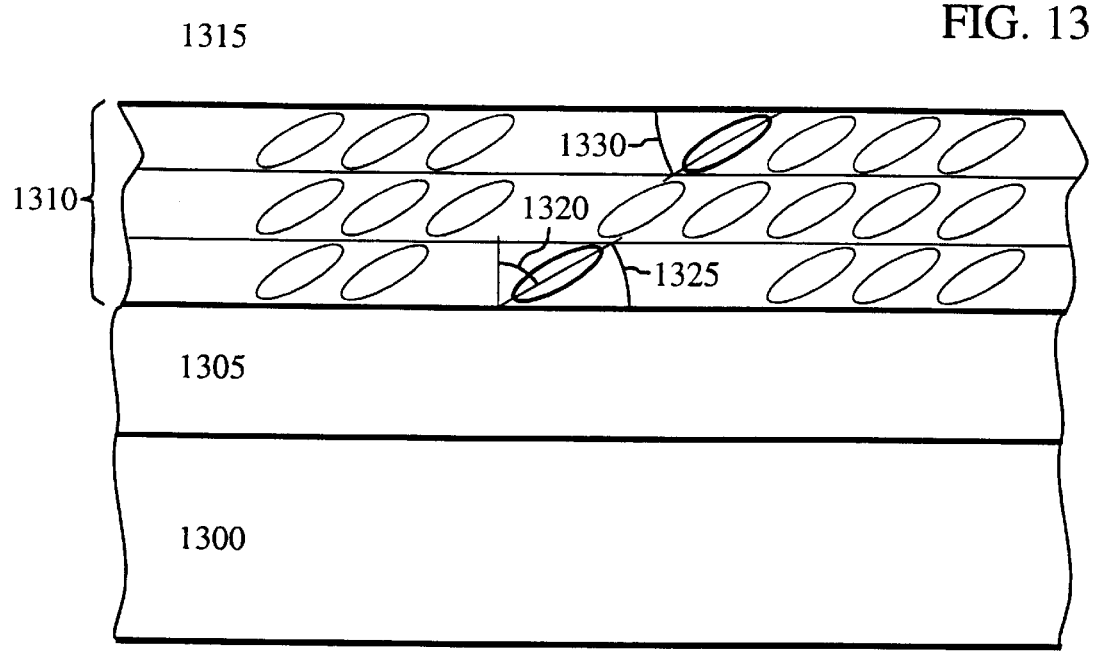
FIG. 13 is another illustrative embodiment of the invention using Smectic-C liquid crystal material in combination with a substrate alignment technique.

An alternative embodiment is shown in FIG. 13. As before, the compensator system comprises a rigid glass substrate 1300, an alignment layer 1305, a polymerizable liquid crystal O-plate monomer layer 1310, a liquid crystal O-plate/alignment layer interface 1310/1305, an air layer 1315, and a liquid crystal/air interface 1310/1315. In this embodiment however, the polymerizable liquid crystal layer 1310 has a smectic-C phase temperature range and a maximum smectic tilt angle 1320 of approximately 45°.

A liquid crystal material with a smectic-C to nematic phase transition is preferred because such materials tend to have a large, in the range of 10° to 45°, smectic tilt angle 1320. The liquid crystal material is comprised of polymerizable monomeric compounds and includes approximately 0.5% of Irgacure-651.

As in the nematic embodiment, an alignment layer 1305 is produced on the surface of the substrate. In a preferred embodiment, the alignment layer material is a thin film of SiO, obliquely deposited at a polar angle of approximately 60° and coated with a thin film of egg lecithin—a homeotropic alignment material. This alignment surface produces a liquid crystal pre-tilt angle 1325 of approximately 85° and a uniform specified azimuthal tilt direction, as determined by the azimuthal SiO deposition angle.

Next, a thin film of polymerizable liquid crystal monomer 1310 is laid down on the alignment layer 1305 by the use of spin coating. The temperature of the liquid crystal film is then raised into its nematic phase, producing a uniform pre-tilt angle 1325 of approximately 85° at the liquid crystal O-plate/alignment layer interface 1310/1305. The temperature is then slowly lowered e.g., at a rate of approximately 0.1° C.-per-minute, into the liquid crystal materials smectic-C phase.

This process forms smectic layers parallel to the surface of the alignment layer with the molecules initially tilted at a smectic tilt angle 1320 of 0°. As the temperature of the liquid crystal layer is lowered into its smectic-C phase, the smectic tilt angle 1320 of the liquid crystal molecules increases. (The azimuthal tilt direction of the molecules is determined by the azimuthal SiO deposition angle.) At a temperature just above the material's melting point, the smectic tilt angle 1320 reaches a maximum value of approximately 45°. Various other ways to form smectic layers parallel the alignment layer will be recognized by those skilled in the art.

Since there is no preferred azimuthal orientation of the liquid crystal at the liquid crystal/air interface 1310/1315, the orientation at this interface is determined by the azimuthal orientation of the liquid crystal at the liquid crystal O-plate/alignment layer interface 1310/1305. Furthermore, in a smectic-C material the polar tilt angle 1330 at the liquid crystal/air interface 1310/1315 does not influence the tilt angle of the bulk liquid crystal material.

The liquid crystal monomer film 1310 is next illuminated with ultraviolet light (actinic radiation) at a wavelength of approximately 360 nm that is sufficient to polymerize the monomer to a polymeric film in which the order of the liquid crystal phase is preserved, typically 4–10 $J/cm^2$. As in the nematic embodiment, the liquid crystalline order that exists in the smectic-C phase of the monomer is preserved in the polymer film produced by photopolymerization. The result of this process is a thin film of liquid crystal polymer that is positively birefringent and has a symmetry axis that is oriented at a polar tilt 1320 angle of approximately 45°.

Smectic-C Electric Field Alignment Embodiment

Figure 14:
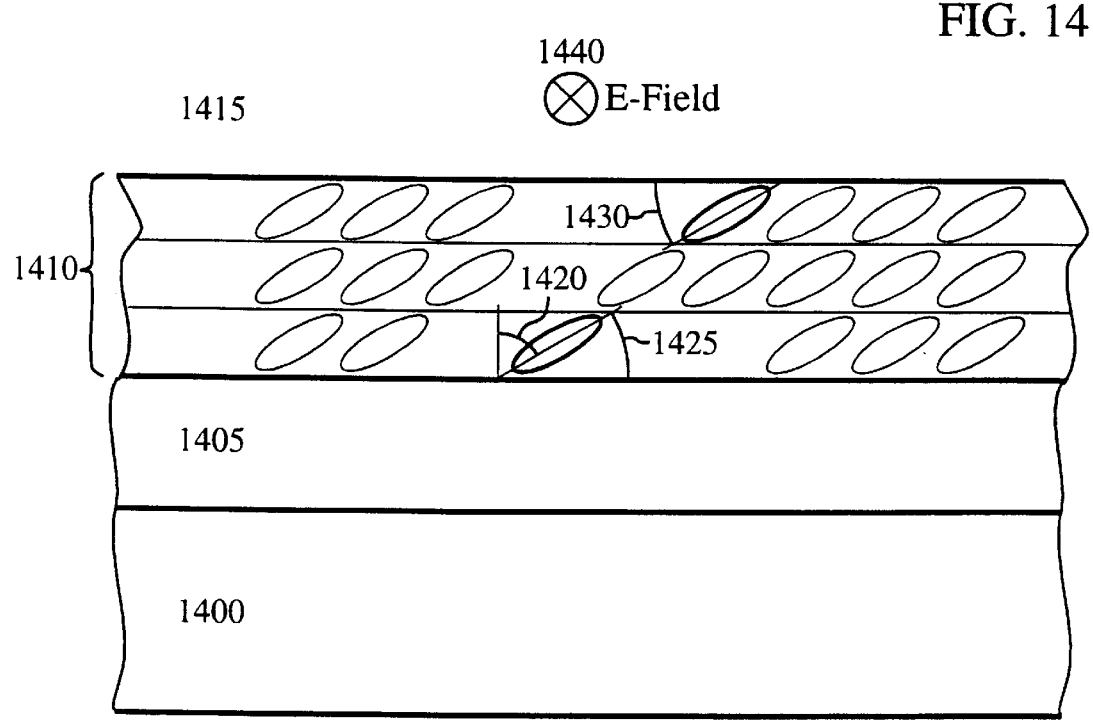
FIG. 14 is another illustrative embodiment of the invention using Smectic-C liquid crystal material in combination with an electric field alignment technique.

A further illustrative liquid crystal display system, see FIG. 14, includes a rigid glass substrate 1400, an alignment layer 1405, a polymerizable liquid crystal monomer layer 1410 having a room temperature chiral smectic-C phase with a high spontaneous polarization of ±2–20 $nC/cm^2$ and a maximum smectic tilt angle 1420 of approximately 45°, a liquid crystal O-plate/alignment layer interface 1410/1405, an air layer 1415, a liquid crystal O-plate/air interface 1410/1415, and a direction 1440 (into the plane of FIG. 14) of an applied electric field.

A liquid crystal material with a smectic-C to nematic transition is preferred because such materials tend to have a large smectic tilt angle 1420—in the range of 10° to 45°. The pitch of the liquid crystal (e.g., the distance normal to a smectic layer over which the azimuthal orientation rotates by 360°) is approximately 100 micrometers ($\mu$m) or more. The liquid crystal is also comprised of polymerizable monomeric compounds and includes 0.5% of Irgacure 651.

Those skilled in the art will appreciate that liquid crystals having different values of spontaneous polarization can be used. Furthermore, the liquid crystal material may be pitch compensated. That is, the liquid crystal material may be comprised of both left- and right-handed chiral smectic-C molecules. The sign and magnitude of the spontaneous polarization of the left-handed molecules may be different from that of the right-handed molecules. The relative amounts of the left-handed and right-handed molecules can be adjusted to produce a relatively long pitch (e.g., significantly greater than the thickness of the liquid crystal film), while still producing a high value of spontaneous polarization of the liquid crystal mixture.

An alignment layer 1405 is laid down on the surface of the substrate 1400 by the use of spin coating. In this embodiment, the alignment layer material is a thin film of egg lecithin, a homeotropic alignment material (e.g., producing a liquid crystal tilt angle 1425 of approximately 90°).

Next, a thin film of polymerizable liquid crystal monomer 1410 is laid down on the alignment layer 1405, as discussed in the previous embodiments. An electric field is then applied to the liquid crystal film 1410 at a polar tilt angle 1425 of 0° and a specified azimuthal angle. In FIG. 14, the direction of the electric field 1440 is perpendicular to the plane of the page.

Following formation of the liquid crystal layer 1410, the temperature of the liquid crystal film is raised into its nematic phase to produce a uniform homeotropic alignment at the liquid crystal O-plate/alignment layer interface 1410/1405. The temperature is then slowly lowered, e.g., at a rate of approximately 0.1° C.-per-minute, into the liquid crystal materials smectic-C phase. This process forms smectic layers that are substantially parallel to the surface of the alignment layer, with the molecules initially tilted at a smectic tilt angle 1420 of 0°. Various other ways to form a smectic layers parallel the alignment layer will be recognized to those skilled in the art.

As the temperature of the liquid crystal layer is lowered into its smectic-C phase, the smectic tilt angle 1420 of the liquid crystal molecules increases. The azimuthal tilt direction of the molecules is generally perpendicular to the direction of the electric field and depends on the polarity of the electric field and the sign of the spontaneous polarization. At a temperature just above the liquid crystal material's melting point, the smectic tilt angle 1420 reaches a maximum value of approximately 45°.

Since there is no preferred azimuthal orientation of the liquid crystal at the liquid crystal/air interface 1410/1415, the orientation at this interface is determined by the azimuthal orientation of the liquid crystal at the liquid crystal O-plate/alignment layer interface 1410/1405. Furthermore, in a smectic-C material the polar tilt angle 1430 at the liquid crystal/air interface 1410/1415 does not influence the tilt angle of the bulk liquid crystal material.

Next, the liquid crystal monomer film 1410 is illuminated with ultraviolet light (actinic radiation) at a wavelength of 360 nm that is sufficient to polymerize the monomer to a polymeric film in which the order of the liquid crystal phase is preserved, typically 4–10 J/cm$^2$. As in the previous embodiments, the liquid crystalline order that exists in the monomer is preserved in the polymer film that is produced be photopolymerization. The result of this process is a thin film of a liquid crystal polymer that is positively birefringent and has a symmetry axis that is oriented at a polar tilt 1420 angle of approximately 45°.

Possible Variations

For each of the previous illustrative embodiments, a number of variations are possible and would be obvious to one skilled in the art of liquid crystal display devices. For example, other possible substrate materials could include polymer films. The polymerizable liquid crystal monomer material may include, as a constituent, molecules that contain multiple reactive functional groups and therefore can act as cross-linking agents. Other polar tilt angles at the liquid crystal/alignment layer interface can be achieved by suitable selection of reactive liquid crystals, modification of the alignment materials, rubbing conditions, etc. Furthermore, a non-reactive liquid crystal material can be combined with the polymerizable liquid crystal. The resulting liquid crystal polymer film would then have the properties of a plastic or gel. The liquid crystal material could also contain a polymer (e.g., a liquid crystal polymer) or oligomer that increases the viscosity of the liquid crystal mixture and improves the film forming properties thereof.

Further, the liquid crystal polymer is expected to have a birefringence of approximately 0.05 to 0.25, depending on the specific chemical structure of the liquid crystal and the polymerization temperature. For this range of birefringence values, useful O-plate compensators would have a thickness of between 0.20 to 10 μm. Furthermore, the O-plate compensators fabricated from polymerizable smectic-C liquid crystal material are expected to be slightly biaxial.

Bibliography

1. Clerc et al., "Liquid Crystal Cell Which Can Have a Homeotropic Structure with Compensated Birefringence of Said Structure," U.S. Pat. No. 4,701,028.
2. Kahn, "The Molecular Physics of Liquid-Crystal Devices," Physics Today, pp. 66–74, May 1982.
3. Macleod, "Structure-Related Optical Properties of Thin Films," J. Vac. Sci. Technol. A, Vol. 4, No. 3, pp. 418–422, 1986.
4. Motohiro and Taga, "Thin Film Retardation Plate by Oblique Deposition," Appl. Opt., Vol. 28, No. 3, pp. 2466–2482, 1989.
5. Yeh et al., "Compensator for Liquid Crystal Display Having Two Types Of Layers With Different Refractive Indices Alternating," U.S. Pat. No. 5,196,953.

It will be appreciated by those of ordinary skill having the benefit of this disclosure that numerous variations from the foregoing illustration will be possible without departing from the inventive concept described herein. Accordingly, it is the claims set forth below, and not merely the foregoing illustrative embodiments, which are intended to define the exclusive rights claimed in this application program.

What is claimed is:

1. A liquid crystal display adapted to be viewed at various angles with respect to a normal axis perpendicular to a major surface of the display, comprising:

a polarizer layer;

an analyzer layer;

a liquid crystal layer disposed between the polarizer layer and the analyzer layer;

a first electrode disposed between the polarizer layer and the analyzer layer and proximate to a first major surface of the liquid crystal layer;

a second electrode disposed between the polarizer layer and the analyzer layer and proximate to a second major surface of the liquid crystal layer opposing the first major surface, the first and second electrodes being adapted to apply a voltage across the liquid crystal layer when the electrodes are connected to a source of electrical potential;

a first positively birefringent O-plate compensator layer disposed between the polarizer layer and the analyzer layer, wherein the first O-plate layer comprises a liquid crystal polymer with its optical symmetry axis oriented at an oblique tilt angle with respect to a major surface of the first O-plate layer; and a second positively birefringent O-plate compensator layer disposed between the polarizer layer and the analyzer layer, wherein the second O-plate layer comprises a liquid crystal polymer with its optical symmetry axis oriented at an oblique tilt angle with respect to a major surface of the second O-plate layer, wherein the projections of the optical symmetry axes of the first and second O-plate layers, respectively, onto the major surface of the display are crossed with respect to each other.

2. The liquid crystal display of claim 1, further comprising a birefringent A-plate compensator layer disposed between the polarizer layer and the analyzer layer.

3. The liquid crystal display of claim 2, wherein the A-plate layer is positively birefringent.

4. The liquid crystal display of claim 2, wherein the A-plate layer is negatively birefringent.

5. The liquid crystal display of claim 1, wherein the liquid crystal polymer of at least one O-plate layer is comprised of a photopolymerized material.

6. The liquid crystal display of claim 5, wherein the photopolymerized material was, before photopolymerization, an ultraviolet (UV) polymerizable liquid crystal acrylate.

7. The liquid crystal display of claim 6, wherein the photopolymerized material had, before photopolymerization, the chemical structure of a phenyl diester diacrylate liquid crystal monomer.

8. The liquid crystal display of claim 1, wherein at least one O-plate layer has substantially uniaxial birefringence.

9. The liquid crystal display of claim 1, wherein the optical symmetry axis of at least one O-plate layer is oriented at a tilt angle of between 20 degrees to 70 degrees with respect to its major surface.

10. The liquid crystal display of claim 1, wherein the optical symmetry axis of at least one O-plate layer is oriented at a tilt angle of between 30 degrees to 60 degrees with respect to its major surface.

11. The liquid crystal display of claim 1, wherein the optical symmetry axis of at least one O-plate layer is oriented at a tilt angle of between 25 degrees to 55 degrees with respect to its major surface.

12. The liquid crystal display of claim 1, wherein the optical symmetry axis of at least one O-plate layer is oriented at a tilt angle of approximately 45 degrees with respect to its major surface.

13. The liquid crystal display of claim 1, wherein the optical symmetry axis of the first O-plate layer is oriented at an azimuthal angle of between zero degrees to 90 degrees, and the optical symmetry axis of the second O-plate layer is oriented at an azimuthal angle of between 90 degrees to 180 degrees.

14. The liquid crystal display of claim 1, wherein the projections of the optical symmetry axes of the first and second O-plate layers, respectively, onto the major surface of the display are crossed with respect to each other such that the angle difference between the azimuthal angles of the first and second O-plate layers is between 20 degrees to 160 degrees.

15. The liquid crystal display of claim 1, wherein the projections of the optical symmetry axes of the first and second O-plate layers, respectively, onto the major surface of the display are crossed with respect to each other such that the angle difference between the azimuthal angles of the first and second O-plate layers is between 45 degrees to 135 degrees.

16. The liquid crystal display of claim 1, wherein the projections of the optical symmetry axes of the first and second O-plate layers, respectively, onto the major surface of the display are crossed with respect to each other such that the angle difference between the azimuthal angles of the first and second O-plate layers is between zero degrees to 90 degrees.

17. The liquid crystal display of claim 1, wherein the projections of the optical symmetry axes of the first and second O-plate layers, respectively, onto the major surface of the display are crossed with respect to each other such that the angle difference between the azimuthal angles of the first and second O-plate layers is approximately 90 degrees.

18. An optical compensator comprising:
a first positively birefringent O-plate compensator layer of liquid crystal polymer having its optical symmetry axis oriented at an oblique tilt angle with respect to a major surface of the first O-plate layer; and
a second positively birefringent O-plate compensator layer disposed on the first O-plate layer, wherein the second O-plate layer comprises a liquid crystal polymer having its optical symmetry axis oriented at an oblique tilt angle with respect to a major surface of the second O-plate layer,
wherein the projections of the optical symmetry axes of the first and second O-plate layers, respectively, onto a major surface of the compensator are crossed with respect to each other.

19. The optical compensator of claim 18, further comprising a birefringent A-plate compensator layer disposed on the second O-plate layer.

20. The optical compensator of claim 19, wherein the A-plate layer is positively birefringent.

21. The optical compensator of claim 19, wherein the A-plate layer is negatively birefringent.

22. The optical compensator of claim 18, wherein the liquid crystal polymer of at least one O-plate layer is comprised of a material that has been photopolymerized.

23. The optical compensator of claim 22, wherein the photopolymerizable material was, before photopolymerization, an ultraviolet (UV) polymerizable liquid crystal acrylate.

24. The optical compensator of claim 23, wherein the photopolymerizable material had, before photopolymerization, the chemical structure of a liquid crystal monomer conventionally known as C6M.

25. The optical compensator of claim 18, wherein at least one O-plate layer has substantially uniaxial birefringence.

26. The optical compensator of claim 18, wherein the optical symmetry axis of at least one O-plate layer is oriented at a tilt angle of between 20 degrees to 70 degrees with respect to its major surface.

27. The optical compensator of claim 18, wherein the optical symmetry axis of at least one O-plate layer is oriented at a tilt angle of between 30 degrees to 60 degrees with respect to its major surface.

28. The optical compensator of claim 18, wherein the optical symmetry axis of at least one O-plate layer is oriented at a tilt angle of between 25 degrees to 55 degrees with respect to its major surface.

29. The optical compensator of claim 18, wherein the optical symmetry axis of at least one O-plate layer is oriented at a tilt angle of approximately 45 degrees with respect to its major surface.

30. The optical compensator of claim 18, wherein the optical symmetry axis of the first O-plate layer is oriented at an azimuthal angle of between zero degrees to 90 degrees, and the optical symmetry axis of the second O-plate layer is oriented at an azimuthal angle of between 90 degrees to 180 degrees.

31. The optical compensator of claim 18, wherein the projections of the optical symmetry axes of the first and second O-plate layers, respectively, onto the major surface of the compensator are crossed with respect to each other such that the angle difference between the azimuthal angles of the first and second O-plate layers is between 20 degrees to 160 degrees.

32. The optical compensator of claim 18, wherein the projections of the optical symmetry axes of the first and second O-plate layers, respectively, onto the major surface of the compensator are crossed with respect to each other such that the angle difference between the azimuthal angles of the first and second O-plate layers is between 45 degrees to 135 degrees.

33. The optical compensator of claim 18, wherein the projections of the optical symmetry axes of the first and second O-plate layers, respectively, onto the major surface of the compensator are crossed with respect to each other such that the angle difference between the azimuthal angles of the first and second O-plate layers is between zero degrees to 90 degrees.

34. The optical compensator of claim 18, wherein the projections of the optical symmetry axes of the first and second O-plate layers, respectively, onto the major surface of the compensator are crossed with respect to each other such that the angle difference between the azimuthal angles of the first and second O-plate layers is approximately 90 degrees.

35. A liquid crystal display adapted to be viewed at various angles with respect to a normal axis perpendicular to a major surface of the display, comprising:
   a polarizer layer;
   an analyzer layer;
   a liquid crystal layer disposed between the polarizer layer and the analyzer layer;
   a first electrode disposed between the polarizer layer and the analyzer layer and proximate to a first major surface of the liquid crystal layer;
   a second electrode disposed between the polarizer layer and the analyzer layer and proximate to a second major of the liquid crystal layer surface opposing the first major surface, the first and second electrodes being adapted to apply a voltage across the liquid crystal layer when the electrodes are connected to a source of electrical potential;
   a first positively birefringent O-plate compensator layer disposed between the polarizer layer and the analyzer layer, wherein the first O-plate layer comprises a liquid crystal polymer of a photopolymerized material with its optical symmetry axis oriented at an oblique tilt angle with respect to a major surface of the first O-plate layer;
   a second positively birefringent O-plate compensator layer disposed between the polarizer layer and the analyzer layer, wherein the second O-plate layer comprises a liquid crystal polymer of a photopolymerized material with its optical symmetry axis oriented at an oblique tilt angle with respect to a major surface of the second O-plate layer; and
   a positively birefringent A-plate compensator layer disposed between the polarizer layer and the analyzer layer,
   wherein the projections of the optical symmetry axes of the first and second O-plate layers, respectively, onto the major surface of the display are crossed with respect to each other such that the angle difference between the azimuthal angles of the first and second O-plate layers is between 45 degrees and 135 degrees.

36. The liquid crystal display of claim 35, wherein the photopolymerized material of at least one O-plate layer had, before photopolymerization, the chemical structure of a liquid crystal monomer conventionally known as C6M.

37. The liquid crystal display of claim 35, wherein the optical symmetry axis of at least one O-plate layer is oriented at a tilt angle of between 20 degrees to 70 degrees with respect to its major surface.

38. An optical compensator comprising:
   a first positively birefringent O-plate compensator layer comprised of a liquid crystal polymer of a photopolymerized material having its optical symmetry axis oriented at an oblique tilt angle with respect to a major surface of the first O-plate layer;
   a second positively birefringent O-plate compensator layer disposed on the first O-plate layer, wherein the second O-plate layer comprises a liquid crystal polymer of a photopolymerized material having its optical symmetry axis oriented at an oblique tilt angle with respect to a major surface of the second O-plate layer; and
   a positively birefringent A-plate compensator layer disposed on the second O-plate layer,
   wherein the projections of the optical symmetry axes of the first and second O-plate layers, respectively, onto a major surface of the compensator are crossed with respect to each other such that the angle difference between the azimuthal angles of the first and second O-plate layers is between 45 degrees and 135 degrees.

39. The optical compensator of claim 38, wherein the photopolymerized material of at least one O-plate layer had, before photopolymerization, the chemical structure of a liquid crystal monomer conventionally known as C6M.

40. The optical compensator of claim 38, wherein the optical symmetry axis of at least one O-plate layer is oriented at a tilt angle of between 20 degrees to 70 degrees with respect to its major surface.

41. An optical compensator comprising:
   a positively birefringent O-plate compensator layer of a liquid crystal polymer having its optical symmetry axis oriented at an oblique tilt angle with respect to a major surface of the O-plate layer; and
   a birefringent A-plate compensator disposed on the O-plate layer, wherein the A-plate layer has an optical symmetry axis oriented substantially parallel with respect to a major surface of the A-plate layer, and wherein the projections of the optical symmetry axis of the O-plate and A-plate layers respectively, onto a major surface of the compensator are crossed with respect to each other.

42. The optical compensator of claim 41, wherein the A-plate layer is positively birefringent.

43. The optical compensator of claim 41, wherein the liquid crystal polymer of the O-plate layer is comprised of a photopolymerized material.

44. The optical compensator of claim 43, wherein the photopolymerized material was, before photopolymerization, an ultraviolet (UV) polymerizable liquid crystal acrylate.

45. The optical compensator of claim 41, wherein the optical symmetry axis of the O-plate layer is oriented at a tilt angle of between 20 degrees to 70 degrees with respect to its major surface.

46. The optical compensator of claim 41, wherein the optical symmetry axis of the O-plate layer is oriented at an azimuthal angle of between zero degrees to 90 degrees, and the optical symmetry axis of the A-plate layer is oriented at an azimuthal angle of between 90 degrees to 180 degrees.

* * * * *